United States Patent
Iizuka et al.

(10) Patent No.: US 7,588,498 B2
(45) Date of Patent: Sep. 15, 2009

(54) GAME APPARATUS AND RECORDING MEDIUM STORING A GAME PROGRAM

(75) Inventors: Etsushi Iizuka, Kyoto (JP); Kouzou Tahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 315 days.

(21) Appl. No.: 11/068,372

(22) Filed: Mar. 1, 2005

(65) Prior Publication Data

US 2005/0197188 A1    Sep. 8, 2005

(30) Foreign Application Priority Data

Mar. 2, 2004   (JP)   .............................. 2004-058034

(51) Int. Cl.
*A63F 9/22* (2006.01)
(52) U.S. Cl. .......................................... 463/44; 463/43
(58) Field of Classification Search ................... 463/36; 345/156
See application file for complete search history.

(56) References Cited

U.S. PATENT DOCUMENTS

| | | | |
|---|---|---|---|
| 5,835,077 A | 11/1998 | Dao et al. | |
| 5,867,158 A | 2/1999 | Murasaki et al. | |
| 5,926,438 A | 7/1999 | Saito | |
| 5,963,199 A * | 10/1999 | Kato et al. .................. | 345/179 |
| 6,201,554 B1 | 3/2001 | Lands | |
| 6,375,572 B1 * | 4/2002 | Masuyama et al. ............. | 463/43 |
| 6,429,846 B2 | 8/2002 | Rosenberg et al. | |
| 6,538,655 B1 * | 3/2003 | Kubota ........................ | 345/474 |
| 6,612,930 B2 * | 9/2003 | Kawagoe et al. ............... | 463/33 |
| 6,641,482 B2 * | 11/2003 | Masuyama et al. ............. | 463/44 |
| 7,148,875 B2 * | 12/2006 | Rosenberg et al. ........... | 345/156 |
| 2002/0109668 A1 * | 8/2002 | Rosenberg et al. ........... | 345/156 |
| 2003/0202101 A1 | 10/2003 | Monroe et al. | |
| 2004/0029640 A1 * | 2/2004 | Masuyama et al. ............ | 463/43 |
| 2004/0219980 A1 | 11/2004 | Bassett et al. | |
| 2005/0014561 A1 * | 1/2005 | Ouchi ......................... | 463/36 |
| 2005/0052430 A1 | 3/2005 | Shahoian et al. | |
| 2005/0227762 A1 * | 10/2005 | Tahara et al. .................. | 463/30 |

(Continued)

FOREIGN PATENT DOCUMENTS

GB    2 390 308 A    1/2004

(Continued)

OTHER PUBLICATIONS

Communication dated May 15, 2008 issued in corresponding European application No. 05 004 534.4-2218.

(Continued)

*Primary Examiner*—Peter DungBa Vo
*Assistant Examiner*—Masud Ahmed
(74) *Attorney, Agent, or Firm*—Nixon & Vanderhye P.C.

(57) ABSTRACT

The player proceeds with a game while operating a touch panel to slant a game stage with a perception that the touch panel is a plane present in a game space and capable of freely slanting. The object moves in accordance with the slant of the game stage, and the viewing direction moves in accordance with the slant to such a position that the game stage appears slanting. Thus, a game allowing the player to input the slant of the game stage in the game space intuitively and easily can be provided.

24 Claims, 18 Drawing Sheets

U.S. PATENT DOCUMENTS

2007/0063986 A1* 3/2007 Hoga et al. .................. 345/173

FOREIGN PATENT DOCUMENTS

| JP | A-H01-179193 | 7/1989 |
| JP | A-H6-285259 | 10/1994 |
| JP | 07-168554 | 7/1995 |
| JP | A-H07-171273 | 7/1995 |
| JP | 09-134269 | 5/1997 |
| JP | 2001-170358 | 6/2001 |
| JP | 2001-229405 | 8/2001 |
| JP | 2002-200340 | 7/2002 |

OTHER PUBLICATIONS

Office Action dated Jul. 10, 2008 issued in corresponding JP Application No. 2004-058034.

* cited by examiner

GAME APPARATUS AND RECORDING MEDIUM STORING A GAME PROGRAM

BACKGROUND OF THE INVENTION

1. Field of the Invention

The present invention relates to a game apparatus and a recording medium storing a game program to be executed by a computer of the game apparatus, and more specifically to a game apparatus including a display section for displaying a game image and a touch panel and a recording medium storing a game program to be executed by a computer of the game apparatus.

2. Description of the Background Art

Conventionally, as disclosed in, for example, Japanese Laid-Open Patent Publication No. 2001-170358, a mobile game apparatus is available which detects a slant thereof using a slant sensor provided therein and changes a virtual slant of a game plane in a game space in accordance with the slant. FIG. 14 of Japanese Laid-Open Patent Publication No. 2001-170358 shows a method for using input data regarding a slanting motion with an X axis or a Y axis set in the mobile game apparatus as the center of motion. When a slant with the X axis as the center of slanting motion is input, a game character (a player character 61 and an NPC 62) on a game screen is displayed as translating in a direction along the Y axis. Specifically, when the mobile game apparatus is slanted in a minus Y axis direction with the X axis as the center of slanting motion, the game character on the game screen is displayed as translating in the minus Y axis direction. When a slant with the Y axis as the center of slanting motion is input, the game character is displayed as translating in a direction along the X axis. Specifically, when the mobile game apparatus is slanted in a minus X axis direction with Y axis as the center of slanting motion, the game character on the game screen is displayed as translating in the minus X axis direction. In summary, the above-identified game apparatus, by processing the data which is input regarding the slant in this manner, displays a game image which makes the player feel that a labyrinth plate (game stage) as a game plane is slanted in the same manner as the game apparatus and the game character slides (rolls) on the slanted labyrinth plate.

However, the game apparatus disclosed in the above-identified publication has the following problems. Since the player slants the mobile game apparatus itself including the display section to manipulate the slant of the game stage, the game image displayed on the display screen may be sometimes difficult to view to the player when the mobile game apparatus is slanted. In addition, since the game stage is slanted when the player changes his/her posture while operating the game apparatus, the player needs to control his/her posture. Since the player basically needs to keep the game apparatus horizontal while operating the game apparatus, the posture of the player during the operation is restricted (for example, it is difficult for the player to play while lying down).

SUMMARY OF THE INVENTION

Therefore, an object of the present invention is to provide a game apparatus which is operable by a player at any posture and allows the player to manipulate the slant of a game stage in a game space intuitively and easily without the visibility of a game image displayed on a display section being spoiled, and a recording medium storing a game program to be executed by a computer in such a game apparatus.

The present invention has the following features to attain the object mentioned above. The reference numerals in the parentheses, the numbers of steps (hereinafter, referred to simply as "S") and the like are provided to show the correspondence with those in the embodiment described later for easier understanding of the present invention, and do not limit the present invention.

The game apparatus (1) according to the present invention displays a game space, in which a game stage (GP) is set, on a first display section (11). The game apparatus comprises a touch panel (13); input coordinate position outputter (S52); slant setter (S53); and first display control (S56, S57, S60). The input coordinate position outputter outputs an input coordinate position (x, y) with respect to a touch panel coordinate position defined in the touch panel, in accordance with a touch operation on the touch panel. The slant setter sets a slant (θ) of the game stage in the game space in accordance with the input coordinate position which is output. The first display control displays, on the first display section, the game stage, the slant of which is changed by the slant setter.

The game apparatus according to the present invention displays a game space on a first display section and executes a game by which a game object B moves on a game stage which is set in the game space. The game apparatus comprises a touch panel; input coordinate position outputter; slant setter; motion regulator (S54); motion controller (S54, S55); and first display control. The input coordinate position outputter outputs an input coordinate position with respect to a touch panel coordinate position defined in the touch panel, in accordance with a touch operation on the touch panel. The slant setter sets a slant of the game stage in the game space in accordance with the input coordinate position which is output. The motion regulator regulates a motion of the game object on the game stage (acceleration a) in accordance with the slant. The motion control controls the motion of the game object in accordance with the slant which is set by the slant setter, based on the regulation of the motion regulator. The first display control displays, on the first display section, the game space including the game object controlled by the motion controller. The game stage may be a simple plane, or a planar or three-dimensional convexed and concaved portions and gaps. The slant (θ) of the game stage may be a virtual slant. Namely, the coordinate position of the game stage is not changed in accordance with the slant, but the game stage may be represented as slanting on the game plane or the object on the game stage may be represented as moving in accordance with the slant, without the coordinate position of the game stage being changed. Needless to say, the coordinate position of the game stage may be changed in accordance with the slant. The motion regulator regulates, for example, the ball on the game stage rolls in accordance with the slant of the game stage. The motion regulator may regulate that an object having a movable section movable in accordance with the gravity is movable in accordance with the slant of the game stage. The touch panel may be provided on the first display section or at a position different from the first display section. In the former case, the player touches the game image representing the game stage, and therefore the player can change the slant intuitively. However, in this case, the game image may be hidden by the finger or the like touching the touch panel. In the latter case, the game image is not hidden by the finger or the like.

The slant setter may set the game stage to be slanted in a first direction (the plus X axis direction; SD in FIG. 6B) when an output value of the input coordinate position regarding a first axis (x axis) of the touch panel coordinate position is larger than a reference value (x coordinate of the reference coordinate position D), and may set the game stage to be slanted in a direction opposite to the first direction (the minus X axis direction; SD in FIG. 8B) when the output value of the input coordinate position regarding the first axis is smaller than the reference value. Specifically, the first direction is a viewing direction of a virtual camera used by the first display control for imaging the game space. Alternatively, the slant setter may set the game stage to be slanted in a second direction (the plus Z axis direction; SD in FIG. 5B) perpendicularly crossing the first direction when an output value of the input coordinate position regarding a second axis (y axis) perpendicularly crossing the first axis of the touch panel coordinate position is larger than a reference value (y coordinate of the reference coordinate position D), and may set the game stage to be slanted in a direction opposite to the second direction (the minus Z axis direction; SD in FIG. 7B) when the output value of the input coordinate position regarding the second axis is smaller than the reference value. Specifically, the second direction is a direction perpendicularly crossing the viewing direction of the virtual camera used by the first display control for imaging the game space. A slanting angle of the game stage in the first direction may be set in accordance with a difference between the value of the input coordinate position regarding at least one of the first axis of the touch panel coordinate position and the second axis perpendicularly crossing the first axis, and the reference value ($\theta x=\theta x+b(x-w)$; FIG. 9B). A slanting angle of the game stage in the second direction may be set in accordance with a difference between the value of the input coordinate position regarding the second axis and the reference value ($\theta z=\theta z+c$ (y−h); FIG. 9C). The slanting angle of the game stage in the first direction may be uniquely determined with respect to the difference between the value of the input coordinate position regarding the first axis of the touch panel coordinate position and the reference value ($\theta x=b(x-w)$). The slanting angle of the game stage in the second direction may be uniquely determined with respect to the difference between the value of the input coordinate position regarding the second axis of the touch panel coordinate position and the reference value ($\theta z=c(y-h)$).

The motion regulator may regulate a motion of the game object moving on the game stage toward the set direction of the slant of the game stage (Ba in FIGS. 5A through 8B).

The first display control may display the game stage, on the first display section, as slanting in the game image in accordance with the slant which is set by the slant setter (FIGS. 11A through 15E). For example, the first display control moves a viewing direction of a virtual camera such that the game stage appears slanting in the direction of the slant which is set by the slant setter with the game object as the center, and thus displays the game space as seen from the virtual camera on the first display section (FIG. 16A and FIG. 16B). Specifically, the first display control moves the viewing direction of the virtual camera in a direction opposite to the direction of the slant which is set by the slant setter with the game object as the center, and thus displays the game stage, on the first display section, as slanting in the direction of the slant in the game image (FIG. 16A and FIG. 16B).

The game apparatus according to the present invention may further comprise a second display section (12) and second display control (S58, S59, S61). The second display section is covered with the touch panel, and is different from the first display section. The second display control displays, on the second display section, a flat plate-like object (SP) as slanting in the game image in accordance with the slant which is set by the slant setter (FIGS. 11A through 15E). Specifically, the second display control moves a viewing direction of the virtual camera in a direction opposite to the direction of the slant which is set by the slant setter with the flat plate-like object as the center, and thus displays the flat plate-like object, on the second display section, as slanting in the direction of the slant in the game image (FIG. 17A and FIG. 17B).

When the slant setter sets the slant, the first display control may fix the slant of the game stage shown in the game image regardless of the slant which is set by the slant setter and displays the slanted game stage on the first display section. In this case, even when the slant is changed by the slant setter, the game stage is not represented as slanting on the first display section.

A recording medium according to the present invention stores a game program to be executed by a computer (21) of a game apparatus which displays a game space in which a game stage is set on a first display section and includes a touch panel. The game program causes the computer to function as input coordinate position detector (S52); slant setter; and first display control. The input coordinate position detector detects an input coordinate position with respect to a touch panel coordinate position defined in the touch panel in accordance with a touch operation on the touch panel. The slant setter sets a slant of the game stage in the game space in accordance with the detected input coordinate position. The first display control displays, on the first display section, the game stage, the slant of which is changed by the slant setter.

A recording medium according to the present invention stores a game program causing a computer of a game apparatus, which displays a game space on a first display section and includes a touch panel, to execute a game by which a game object moves on a game stage which is set in the game space. The game program causes the computer to function as input coordinate position detector; slant setter; motion regulator; motion control; and first display control. The input coordinate position detector detects an input coordinate position with respect to a touch panel coordinate position defined in the touch panel, in accordance with a touch operation on the touch panel. The slant setter sets a slant of the game stage in the game space in accordance with the detected input coordinate position. The motion regulator regulates a motion of the game object on the game stage in accordance with the slant. The motion controller controls the motion of the game object in accordance with the slant which is set by the slant setter, based on the regulation of the motion regulator. The first display control displays, on the first display section, the game space including the game object controlled by the motion controller.

The slant setter may set the game stage to be slanted in a first direction when a detected value of the input coordinate position regarding a first axis of the touch panel coordinate position is larger than a reference value, and may set the game stage to be slanted in a direction opposite to the first direction when the detected value of the input coordinate position regarding the first axis is smaller than the reference value. Specifically, the first direction is a viewing direction of a virtual camera used by the first display control for imaging the game space. Alternatively, the slant setter may set the game stage to be slanted in a second direction perpendicularly crossing the first direction when a detected value of the input coordinate position regarding a second axis perpendicularly crossing the first axis of the touch panel coordinate position is larger than a reference value, and may set the game stage to be slanted in a direction opposite to the second direction when the detected value of the input coordinate position regarding the second axis is smaller than the reference value. Specifically, the second direction is a direction perpendicular crossing the viewing direction of the virtual camera used by the first display control for imaging the game space. The slant setter may set a slanting angle of the game stage in the first direction in accordance with a difference between the value of the input coordinate position regarding the first axis of the touch panel coordinate position and the reference value.

The motion regulator may regulate a motion of the game object moving on the game stage toward the set direction of the slant.

The first display control may display the game stage, on the first display section, as slanting in the game image in accordance with the slant which is set by the slant setter. For example, the first display control moves a viewing direction of a virtual camera such that the game stage appears slanting in the direction of the slant which is set by the slant setter with the game object as the center, and thus displays the game space as seen from the virtual camera on the first display section. Specifically, the first display control moves the viewing direction of the virtual camera in a direction opposite to the direction of the slant which is set by the slant setter with the game object as the center, and thus displays the game stage, on the first display section, as slanting in the direction of the slant in the game image.

The game apparatus may further comprise a second display section covered with the touch panel and different from the first display section. In this case, the game program stored in the recording medium causes the computer to function further as second display control for displaying, on the second display section, a flat plate-like object as slanting in the game image in accordance with the slant which is set by the slant setter. Specifically, the second display control moves the viewing direction of the virtual camera in a direction opposite to the direction of the slant which is set by the slant setter with the flat plate-like object as the center, and thus displays the flat plate-like object, on the second display section, as slanting in the direction of the slant in the game image.

When the slant setter sets the slant, the first display control may fix a slant of the game stage shown in the game image regardless of the slant which is set by the slant setter and displays the slanted game stage on the first display section.

According to the game apparatus of the illustrative embodiment, the touch panel can be operated to slant the game plane in the game space with a perception that the touch panel is the game stage itself. Therefore, the player can input the slant of the game plane intuitively and easily. Touching the touch panel is associated with pressing the game stage, and thus the game apparatus can give the user the perception that the pressed game stage is rotated (slanted) in the direction of pressing. In addition, since the game apparatus does not need to be slanted with respect to the eyes of the player, the game plane does not become difficult to view, and the degree of freedom of the player's posture during playing is raised.

When the slant setter sets the slant of the game stage in the first direction or a direction opposite to the first direction in accordance with the relationship between the value of the input coordinate position regarding the first axis and the reference value, the player can intuitively and easily slant the game stage in one direction with respect to the game space using the touch panel. When the first direction is the viewing direction of a virtual camera used by the first display control section for imaging the game space, the slant of the game image displayed on the first display section in the depth direction (or the opposite direction) is changed by the value of the input coordinate position regarding the first axis of the touch panel coordinate position. Therefore, when hoping to slant the game stage in the depth direction while viewing the game image, the player can touch-operate the touch panel so as to increase or decrease the value of the input coordinate position regarding the first axis as compared to the reference value. When hoping to slant the game stage in the direction opposite to the depth direction, the player can touch-operate the touch panel so as to decrease or increase the value of the input coordinate position regarding the first axis as compared to the reference value. Thus, even when the viewing direction of the virtual camera is changed, the player can change the slant based on the game image displayed on the first display section without being confused. When the slant setter sets the slant of the game stage in the second direction perpendicularly crossing the first direction or a direction opposite to the second direction in accordance with the relationship between the value of the input coordinate position regarding the second axis perpendicularly crossing the first axis and the reference value, the player can intuitively and easily slant the game stage in any direction with respect to the game space using the touch panel. When the second direction is a direction perpendicularly crossing the viewing direction of the virtual camera used by the first display control section for imaging the game space, the slant of the game image displayed on the first display section in the right-left direction is changed by the value of the input coordinate position regarding the second axis of the touch panel coordinate position. Therefore, when hoping to slant the game stage in the left direction while viewing the game image, the player can touch-operate the touch panel so as to increase or decrease the value of the input coordinate position regarding the second axis as compared to the reference value. When hoping to slant the game stage in the right direction, the player can touch-operate the touch panel so as to decrease or increase the value of the input coordinate position regarding the second axis as compared to the reference value. Thus, even when the viewing direction of the virtual camera is changed, the player can change the slant based on the game image displayed on the first display section without being confused. When the slant setter sets the slanting angle in accordance with the difference between the value of the input coordinate position and the reference value, the player can easily change both the slanting direction and the slanting angle of the game space with respect to the game space using the touch panel by one step of operation.

When the operation regulator regulates the motion of the game object moving on the game stage in the slanting direction, a game, by which the game object in the game space moves in the slanting direction of the game stage by the operation of the player of intuitively slanting the game stage, can be provided.

When the first display control section displays the game stage as slanting in the game image, the player can press the touch panel with a perception that the touch panel is a plane present in the game space, so that a game image in which the game stage slants in accordance with the touch operation can be displayed. Thus, the player can change the slant of the displayed game stage intuitively and easily. When the first display control displays the game image by moving the viewing direction of the virtual camera in a direction opposite to the slanting direction, a game image representing the slant of the game stage can be displayed without slanting the game stage itself or the game space.

In the case where the second display section covered with the touch panel is provided, a flat plate-like object slanting in accordance with the touch operation can be displayed on the second display section. In this case, the player can use it as a guide for slant input by the touch operation. When the second display control displays the game image by moving the viewing direction of the virtual camera in a direction opposite to the slanting direction, a game image representing the slant of the flat plate-like object can be displayed without slanting the flat plate-like object itself with respect to the game space.

By constantly fixing the slant of the game stage displayed in the game image of the first display section, the dizziness felt by the player due to operating the three-dimensional space can be alleviated.

According to the recording medium storing the game program according to the present invention, substantially the same effects as described above regarding the game apparatus can be provided by causing the computer of the game apparatus to execute the game program.

These and other objects, features, aspects and advantages of the present invention will become more apparent from the following detailed description of the illustrative embodiment when taken in conjunction with the accompanying drawings.

DESCRIPTION OF THE PREFERRED EMBODIMENTS

Figure 1:
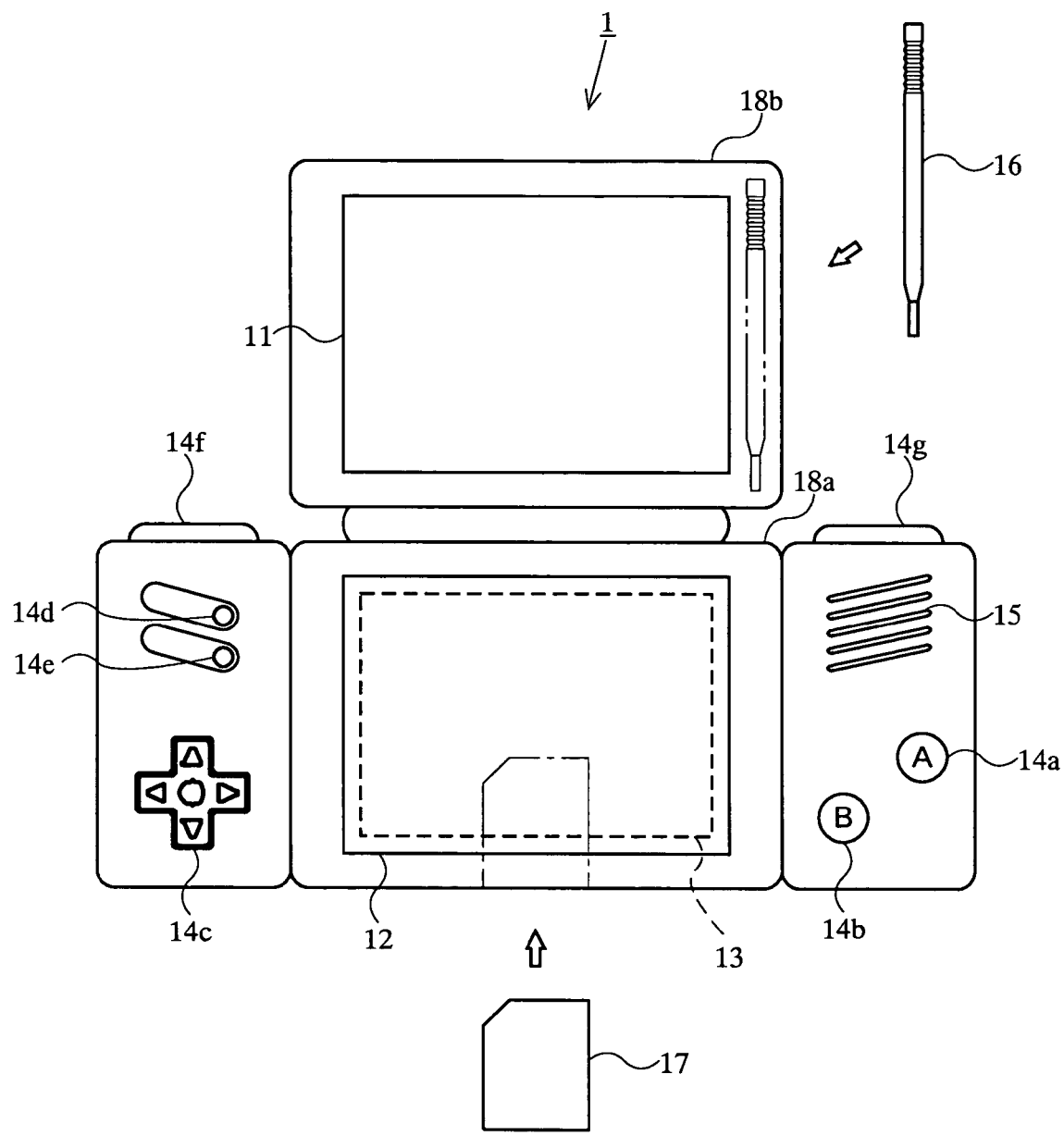
FIG. 1 is an external view of a game apparatus 1 for executing a game program according to one embodiment of the present invention.

With reference to the attached drawings, a game apparatus for executing a game program according to one embodiment of the present invention will be described. FIG. 1 is an external view of a game apparatus 1 for executing the game program. Herein, a mobile game apparatus is described as one example of the game apparatus 1.

In FIG. 1, the game apparatus 1 includes two liquid crystal displays (LCDs) 11 and 12, which are accommodated in a housing 18 so as to be located at predetermined positions. Specifically, in the case where the first liquid crystal display (hereinafter, referred to as the "LCD") 11 and the second LCD 12 are accommodated in a vertically stacking manner, the housing 18 includes a lower housing 18a and an upper housing 18b. The upper housing 18b is pivotably supported by a part of an upper surface of the lower housing 18a. The upper housing 18b has a planar shape slightly larger than a planar shape of the first LCD 11, and has an opening for exposing a display screen of the first LCD 11 on one main surface thereof. The lower housing 18a has a planar shape longer in the horizontal direction than the planar shape of the upper housing 18b, and has an opening for exposing a display screen of the second LCD 12 at approximately the center of the lower housing 18b in the horizontal direction. One of two side sections of the lower housing 18a interposing the second LCD 12 has speaker holes of a speaker 15, and each of the two side sections has an operation switch section 14.

The operation switch section 14 includes an operation switch (button A) 14a and an operation switch (button) 14b which are attached to one main surface of the side section of the lower housing 18a which is to the right of the second LCD 12 as seen in FIG. 1. The operation switch section 14 also includes a direction indication switch (cross key) 14c, a start switch 14d, and a select switch 14e which are attached to one main surface of the side section of the lower housing 18a to the left of the second LCD 12 as seen in FIG. 1. The lower housing 18a further includes side surface switches 14f and 14g, which are respectively provided on the upper surfaces of the side sections of the lower housing 18a to the left and to the right of the second LCD 12. When necessary, further operation switches may be provided, or unnecessary operation switches may be removed.

On an upper surface (the surface entirely shown in FIG. 1) of the second LCD 12, a touch panel 13 (surrounded by the dashed line in FIG. 1) is provided. The touch panel 13 is of, for example, any of a resistance film system, an optical (infrared) system, and a static capacitance coupling system. When a stick 16 (or a finger) presses, moves on, or touches an upper surface of the touch panel 13, the coordinate position of the stick 16 is detected and the coordinate data is output.

In the vicinity of a side surface of the upper housing 18b, an accommodation hole (an area represented by the two-dot chain line in FIG. 1) is formed when necessary for accommodating the stick 16 for operating the touch panel 13. In a part of one surface of the lower housing 18a, a cartridge insertion section (an area represented by the one-dot chain line in FIG. 1) is formed, for detachably accepting a game cartridge 17 (hereinafter, referred to simply as the "cartridge 17") having a built-in memory (e.g., a ROM) which stores a game program. The cartridge 17 is a memory medium storing a game program, and is, for example, a nonvolatile semiconductor memory such as a ROM or a flash memory. A part of the lower housing 18b inner to the cartridge insertion section has a built-in connector (see FIG. 2) to be electrically connected with the cartridge 17. The lower housing 18a (or the upper housing 18b) accommodates an electronic circuit board having various electronic components such as a CPU and the like mounted thereon. The memory medium for storing the game program is not limited to the nonvolatile semiconductor memory, but may be a CD-ROM, a DVD, or a similar optical disc-shaped memory medium.

Figure 2:
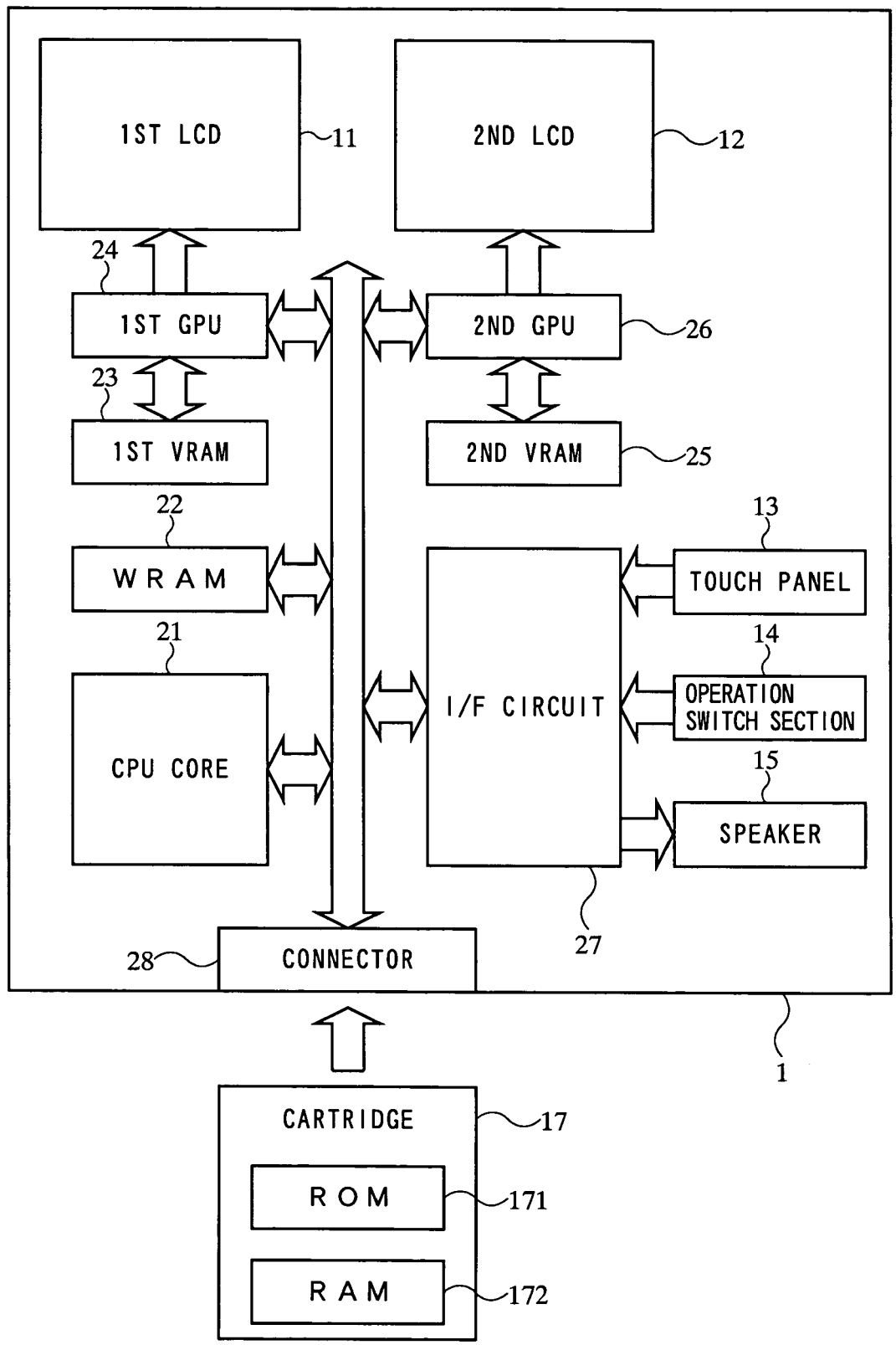
FIG. 2 is a block diagram showing an internal structure of the game apparatus 1.

Next, with reference to FIG. 2, an internal structure of the game apparatus 1 will be described. FIG. 2 is a block diagram showing the internal structure of the game apparatus 1.

In FIG. 2, an electronic circuit board accommodated in the housing 18 has a CPU core 21 mounted thereon. The CPU core 21 is connected to the connector 28, to be connected to the cartridge 17, via a predetermined bus, and the CPU core 21 is also connected to an input/output interface (I/F) circuit 27, a first graphic processing unit (first GPU) 24, a second graphic processing unit (second GPU) 26, and a working RAM (WRAM) 22.

To the connector 28, the cartridge 17 is detachably connectable. As described above, the cartridge 17 is a memory medium for storing a game program. Specifically, the cartridge 17 has a ROM 171 storing the game program and a RAM 172 rewritably storing backup data mounted thereon. The game program stored in the ROM 171 in the cartridge 17 is loaded on the WRAM 22, and the game program loaded on the WRAM 22 is executed by the CPU core 21. Temporary data and data for generating an image which are obtained by the CPU core 21 through execution of the game program are stored in the WRAM 22.

As described above, the ROM 171 stores a game program, which is a group of instructions and a group of data in the format executable by the computer of the game apparatus 1, especially by the CPU core 21. The game program is read into and executed by the WRAM 22 when necessary. In this embodiment, the game program and the like are recorded in the cartridge 17, but the game program and the like may be supplied by another medium or via a communication network.

The I/F circuit 27 is connected to the touch panel 13, the operation switch section 14, and the speaker 15. The speaker 15 is located at a position just inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22 and draws the first game image in the first VRAM 23. In accordance with an instruction from the CPU core 21, the second GPU 26 generates a second game image based on data for generating an image stored in the WRAM 22 and draws the second game image in the second VRAM 25.

The first GPU 24 is connected to the first LCD 11, and the second GPU 26 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

The I/F circuit is a circuit for exchanging data between external input/output devices such as the touch panel 13, the operation switch section 14, the speaker 15 and the like, and the CPU core 21. The touch panel 13 (including a device driver for the touch panel 13) has a coordinate system corresponding to a coordinate system of the second VRAM 25, and outputs coordinate position data corresponding to the position which is input (indicated) by the stick 16 or the like. The resolution of the display screen of the second LCD 12 is, for example, 256 dots×192 dots, and the detection precision of the touch panel 13 is 256 dots×192 dots in correspondence with the resolution of the display screen of the second LCD 12. The precision detection of the touch panel 13 may be lower or higher than the resolution of the display screen of the second LCD 12.

Figure 3:
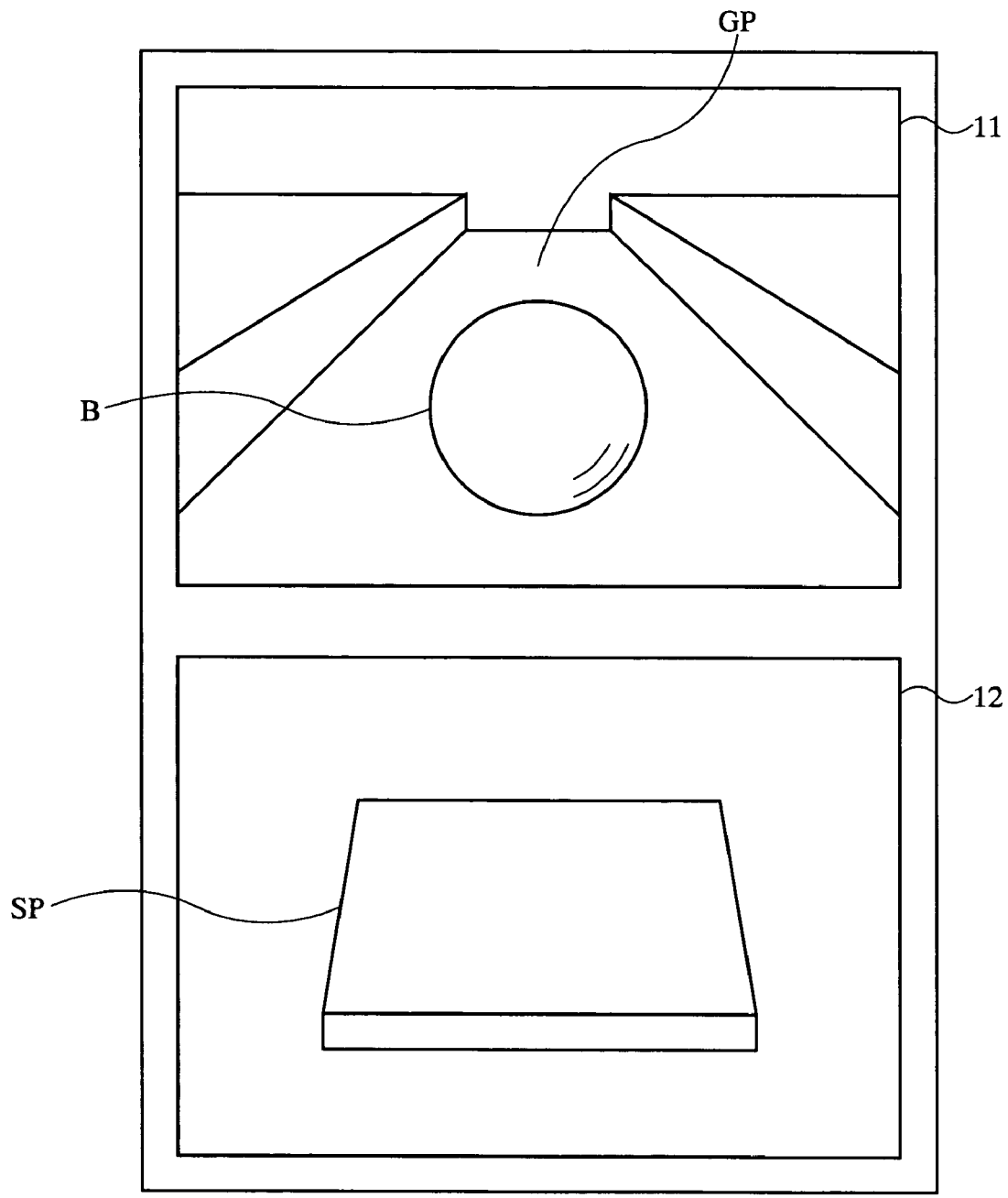
FIG. 3 shows an example of a first game image displayed on a first LCD 11 and an example of a second game image displayed on a second LCD 12.

A flowchart of the procedure executed by the game program executed using the game apparatus 1 will be described. Before that, for easier understanding of the present invention, a game provided by the game apparatus 1 for executing the game program will be described with reference to FIGS. 3 through 17B. FIGS. 3 through 17 show examples of game planes and contents of processing. FIG. 3 shows an example of the first game image displayed on the first LCD 11 and an example of the second game image displayed on the second LCD 12. FIGS. 4A through 10 show virtual slants of a game plane which are set in accordance with the touch operation by the player and accelerations of the ball. FIGS. 11A through 17B show viewing directions of virtual cameras which are set in accordance with the slants of the virtual game plane, and examples of the game images taken by the virtual cameras.

In FIG. 3, the first game image shows a three-dimensional game space formed of three-dimensional data. The first game image shows a labyrinth-looking game stage (game plane GP) which is set in the game space and a ball object rolling on the game stage (ball B). As the game stage, a path on which the ball object can be rolled may be drawn on a simple plane, or a path on which the ball object can be rolled may be provided by planar or three-dimensional convexed and concaved portions and gaps. In the latter case, the game stage is not strictly a plane. However, for the sake of simplicity, the game stage is referred to as the "game plane GP" with an assumption that even in the latter case, the path is formed based on a certain plane. The ball object will be referred to as the "ball B".

In this example, the viewing direction of the virtual camera which creates the first game image is fixed in the game space. For example, the viewing direction is fixed in such a direction that the direction projected on the X-Z plane in the game space coordinate system is parallel to the Z axis, and the direction projected on the Y-Z plane crosses Z axis at 30 degrees. Since the point of attention of the camera is fixed to the center of the ball B, the position of the camera moves as the ball B moves. Alternatively, the viewing direction of the camera may be moved in accordance with the course of the game. For example, the viewing direction of the camera may be matched to the moving direction of the ball B.

The second game image shows a three-dimensional space formed of three-dimensional data. The second game image shows an image representing a virtual slant of the game plane GP (sub planar image SP). In accordance with the virtual slant of the game plane GP, the sub planar image SP slants and is displayed in the second image.

For creating the first game image and the second game image, one same game space or different game spaces may be used. For example, when different spaces are used for creating the first game image and the second game image, in the first image, the game stage having a labyrinth-looking shape is displayed as the game plane GP; and in the second game image, an object simply having a flat plate-like shape is displayed as the sub planar image SP (in the example of FIG. 3). When the same game space is used for creating the first game image and the second game image, in the first game image, the game stage having a labyrinth-looking shape is displayed as the game plane GP; and in the second game image, the entirety of the game plane GP (game stage) having the labyrinth-looking shape is displayed as the sub planar image SP. Namely, a virtual camera for creating the first game image and a virtual camera for creating the second game image are provided, and the game plane as the common target is taken by the two virtual cameras. (The position of the virtual camera for creating the second game image is set far from the game plane in order to take the entirety of the game plane.)

Figure 4A:
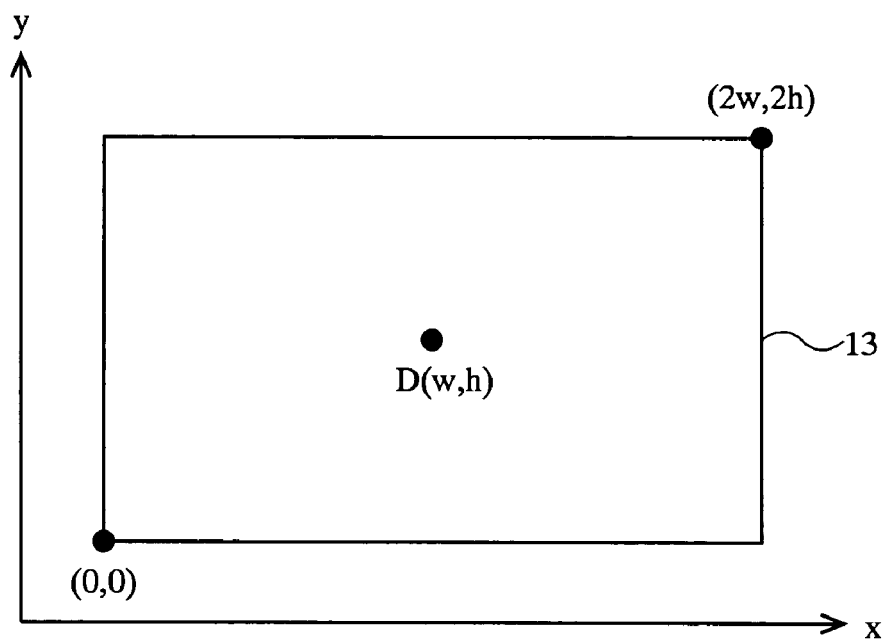
FIG. 4A and FIG. 4B show a touch panel coordinate position which is set on a touch panel 13 shown in FIG. 1, and a game space coordinate position and a game plane GP which are set in a game space.
Figure 4B:
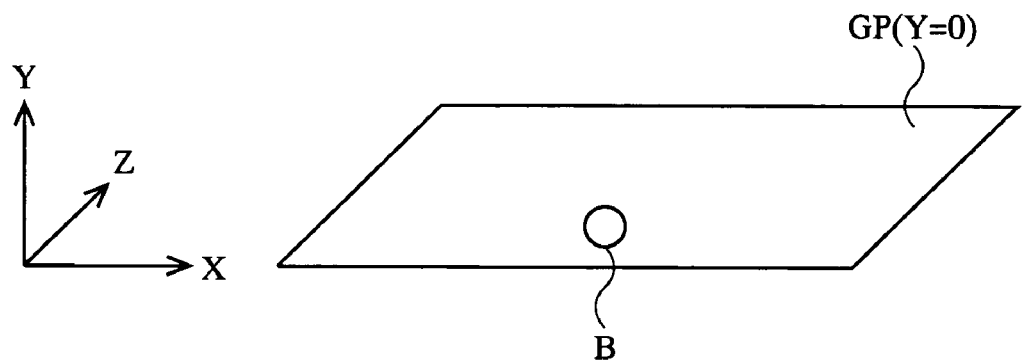

FIG. 4A shows a touch panel coordinate system which is set in the touch panel 13. FIG. 4B shows a game space coordinate system which is set in the game space, and the game plane GP. The touch panel 13 shown in FIG. 4A is located in the same direction as in FIG. 1 (i.e., the first LCD 11 is located above the touch panel 13 in FIG. 4A). The following description will be given based on this direction of location. A touch panel coordinate position is set by two-dimensional coordinates (x, y), where the horizontal direction of the touch panel 13 is set as the x axis (the plus direction is the rightward direction) and the vertical direction of the touch panel 13 is set as the y axis (the plus direction is the upward direction). The lower left corner of the touch panel 13 is set as a touch panel coordinate position (0, 0), and the upper right corner of the touch panel 13 is set as a touch panel coordinate position (2w, 2h). The center of the touch panel 13 (i.e., a touch panel coordinate position (w, h)) is set as the reference coordinate position D.

In FIG. 4B, the game space coordinate system is set by X, Y and Z axes perpendicular to one another. The game plane GP is set at the position of Y=0. In the game space coordinate system, the horizontal direction of the game plane GP shown in FIG. 4B is set as the X axis (the plus direction is the rightward direction), and the vertical direction of the game plane GP is set as the Z axis (the plus direction is the inward direction on the sheet of FIG. 4B). The position of the game plane GP in the game space is always fixed (always Y=0) for the touch operation described later, and a virtual slant is set in a direction in accordance with the touch operation by the player. The ball B is located in contact with the top surface of the game plane GP, i.e., the surface of the game plane GP on the plus side of the Y axis direction. In the game space, a virtual gravity is defined in the minus Y axis direction, and the ball B moves while rolling on the game plane GP by the virtual gravity in accordance with the virtual slant of the game plane GP.

Figure 5A:
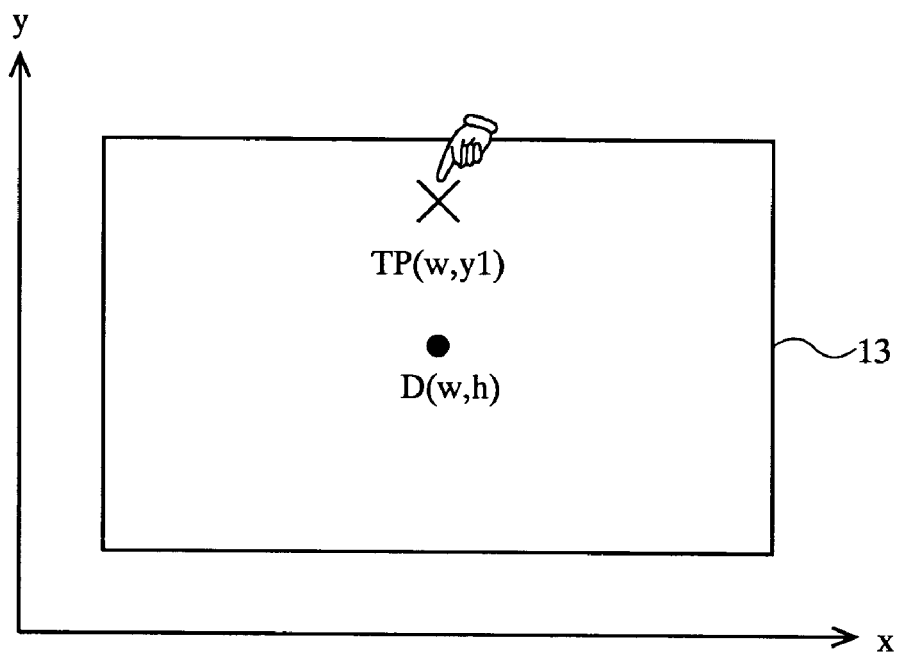
FIG. 5A and FIG. 5B show processing which is performed on the game plane GP and a ball B when an upper area of the touch panel 13 shown in FIG. 1 is touch-operated.
Figure 5B:
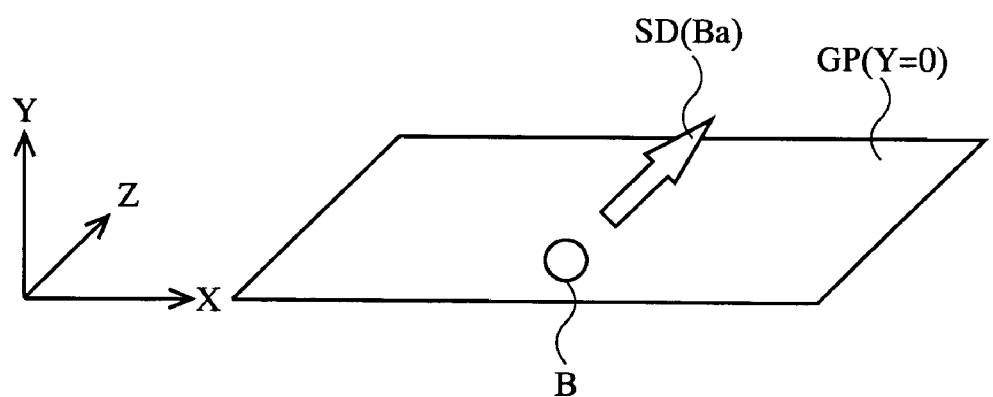

FIG. 5A and FIG. 5B illustrate processing performed on the game plane GP and the ball B (FIG. 5B) when an upper area of the touch panel 13 is operated (touch-operated) (FIG. 5A). It is assumed that, as shown in FIG. 5A, the player touch-operates a touch coordinate position TP (w, y1) on the touch panel 13, which is in the plus y axis direction with respect to the reference coordinate position D. FIG. 5A shows a mark representing a hand at the touch coordinate position TP. This mark schematically shows the hand of the player performing the touch operation. (The same is applied to FIG. 6 et seq.) In the above-mentioned case, the virtual slanting direction SD set for the game plane GP is the plus Z axis direction of the game space coordinate system. (Namely, the game plane slants such that a position in the plus Z axis direction is lower than a position in the minus Z axis direction.)

The slanting direction SD is not the direction in which the game plane GP is actually slanted in the game space, but is a parameter showing the direction in which the game plane GP is virtually slanted with the position of the game plane GP being fixed (Y=0). For the ball B, an acceleration direction Ba is set in accordance with the slanting direction SD. The ball B moves while rolling on the game plane GP in the acceleration direction Ba. In the example of FIG. 5B, the acceleration direction Ba is set at the same direction as the slanting direction SD (the plus Z axis direction).

Figure 6A:
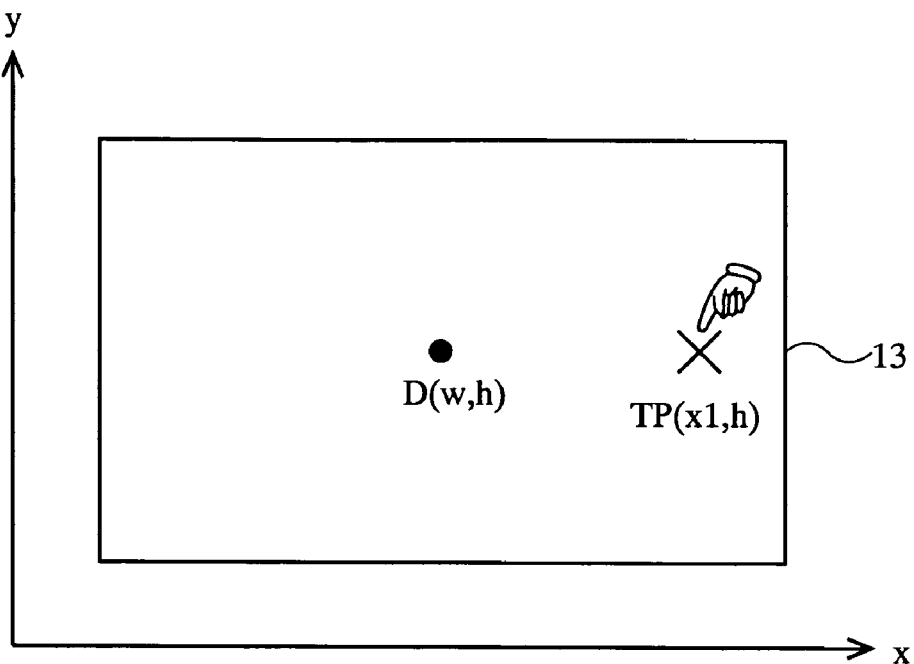
FIG. 6A and FIG. 6B show processing which is performed on the game plane GP and the ball B when a right area of the touch panel 13 shown in FIG. 1 is touch-operated.
Figure 6B:
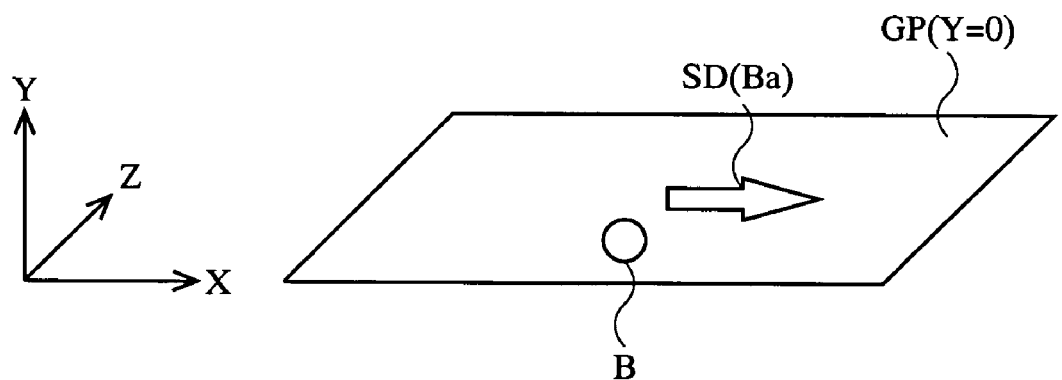

FIG. 6A and FIG. 6B illustrate processing performed on the game plane GP and the ball B (FIG. 6B) when a right area of the touch panel 13 is touch-operated (FIG. 6A). It is assumed that, as shown in FIG. 6A, the player touch-operates a touch coordinate position TP (x1, h) on the touch panel 13, which is in the plus x axis direction with respect to the reference coordinate position D. In this case, the virtual slanting direction SD set for the game plane GP is the plus X axis direction of the game space coordinate system. (Namely, the game plane slants such that a position in the plus X axis direction is lower than a position in the minus X axis direction.) The acceleration direction Ba for the ball B is set at the same direction as the slanting direction SD (the plus X axis direction).

Figure 7A:
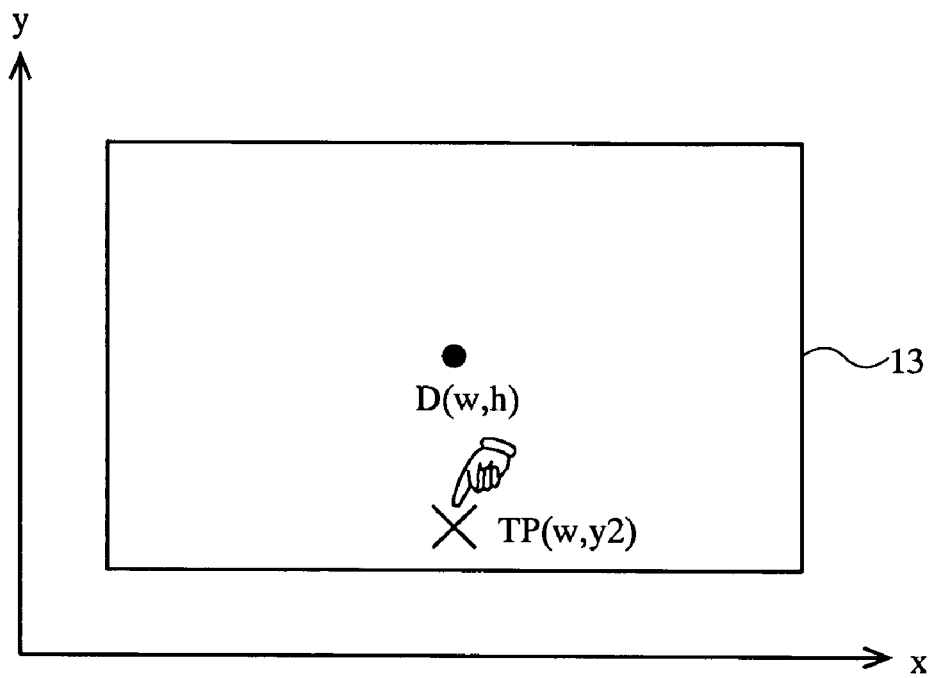
FIG. 7A and FIG. 7B show processing which is performed on the game plane GP and the ball B when a lower area of the touch panel 13 shown in FIG. 1 is touch-operated.
Figure 7B:
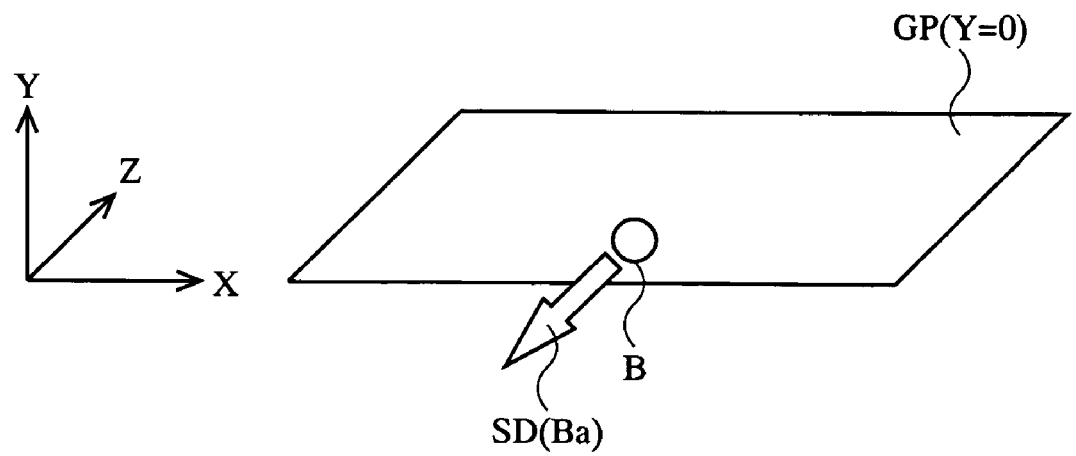

FIG. 7A and FIG. 7B illustrate processing performed on the game plane GP and the ball B (FIG. 7B) when a lower area of the touch panel 13 is touch-operated (FIG. 7A). It is assumed that, as shown in FIG. 7A, the player touch-operates a touch coordinate position TP (w, y2) on the touch panel 13, which is in the minus y axis direction with respect to the reference coordinate position D. In this case, the virtual slanting direction SD set for the game plane GP is the minus Z axis direction of the game space coordinate system. (Namely, the game plane slants such that a position in the minus Z axis direction is lower than a position in the plus Z axis direction.) The acceleration direction Ba for the ball B is set at the same direction as the slanting direction SD (the minus Z axis direction).

Figure 8A:
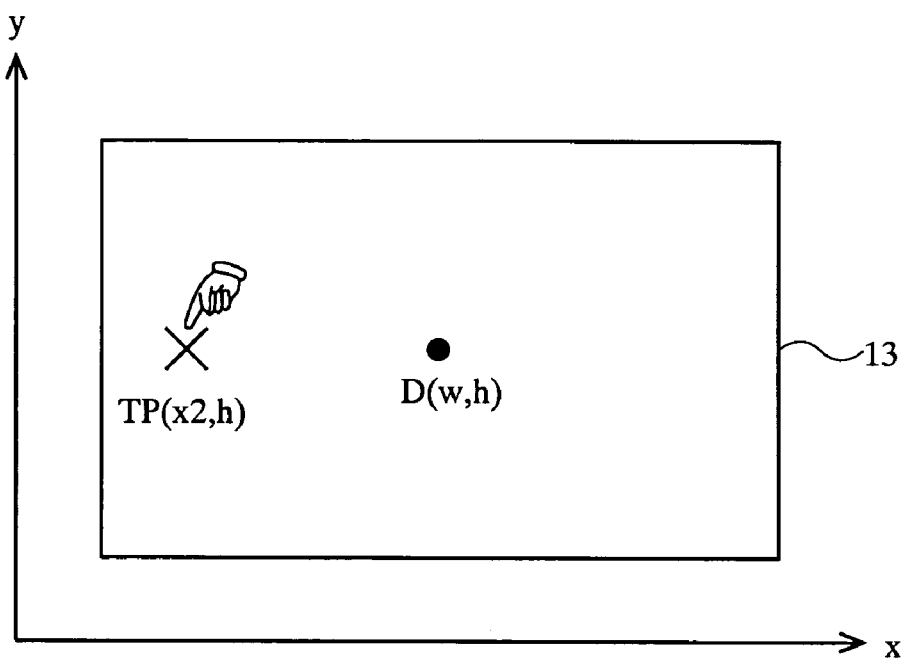
FIG. 8A and FIG. 8B show processing which is performed on the game plane GP and the ball B when a left area of the touch panel 13 shown in FIG. 1 is touch-operated.
Figure 8B:
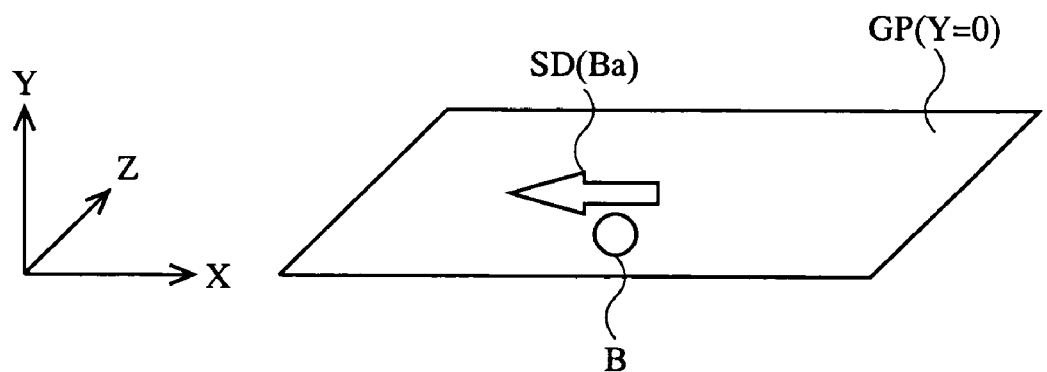

FIG. 8A and FIG. 8B illustrate processing performed on the game plane GP and the ball B (FIG. 8B) when a left area of the touch panel 13 is touch-operated (FIG. 8A). It is assumed that, as shown in FIG. 8A, the player touch-operates a touch coordinate position TP (x2, h) on the touch panel 13, which is in the minus x axis direction with respect to the reference coordinate position D. In this case, the virtual slanting direction SD set for the game plane GP is the minus X axis direction of the game space coordinate system. (Namely, the game plane slants such that a position in the minus X axis direction is lower than a position in the plus X axis direction.) The acceleration direction Ba for the ball B is set at the same direction as the slanting direction SD (the minus X axis direction).

As shown in FIGS. 5A through 8B, the virtual slanting direction SD for the game plane GP is set in accordance with the location of the touch coordinate position TP with respect to the reference coordinate position D. The slanting direction SD is set such that, when the touch panel 13 is replaced with the game plane GP, the game plane GP is virtually slanted in the direction which is input by the player through the touch operation with respect to the reference coordinate position D.

In other words, when operating (pressing) the touch panel 13, the player feels as if he/she pressed and slanted the game plane GP. In the above description with reference to FIGS. 5A through 8B, either one of the x coordinate or the y coordinate of the touch coordinate position matches that of the reference coordinate position, for the sake of simplicity. In the case where neither the x coordinate nor the y coordinate of the touch coordinate position matches that of the reference coordinate position, the slanting in the X axis direction of the game plane is determined based on the x coordinate of the touch coordinate position TP as shown in FIGS. 5A through 6B, and the slanting in the Z axis direction of the game plane is determined based on the y coordinate of the touch coordinate position TP as shown in FIGS. 7A through 8B.

Figure 9A:
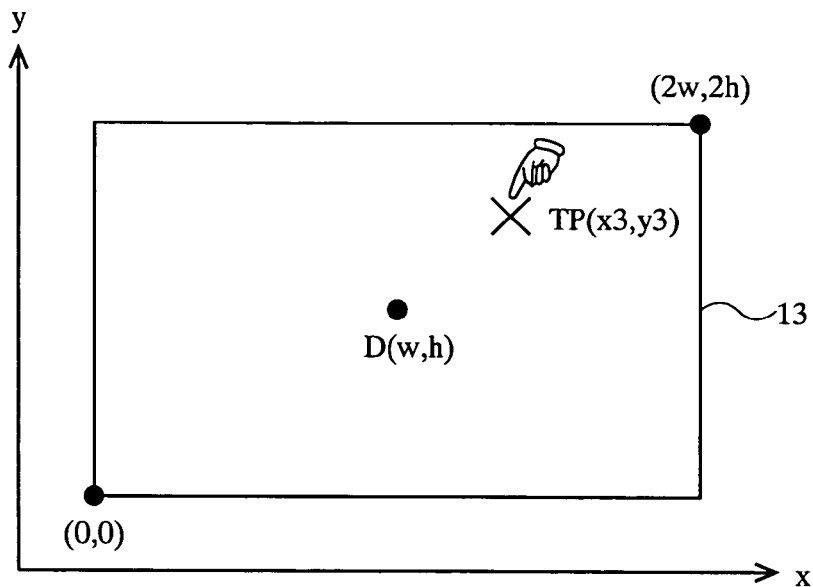
FIGS. 9A through 9C illustrate virtual slanting angles which are set for the game plane GP when the touch panel 13 shown in FIG. 1 is touch-operated.
Figure 9B:
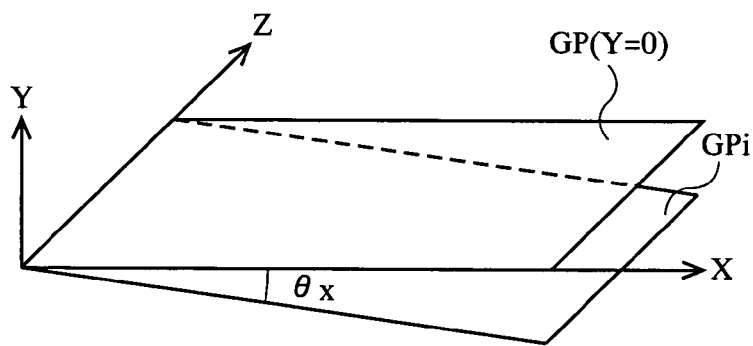
Figure 9C:
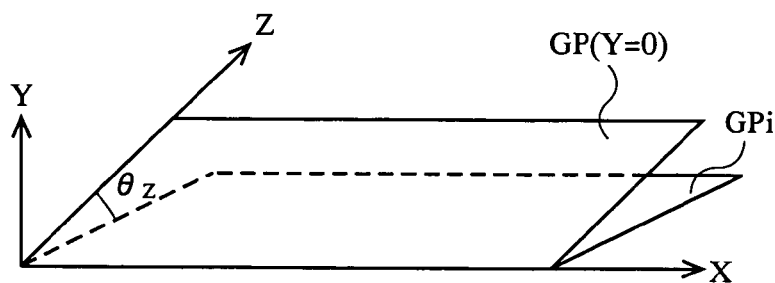

FIGS. 9A through 9C illustrate virtual slanting angles set for the game plane GP when the touch panel 13 is touch-operated. The virtual slanting angle is not the angle at which the game plane GP is actually slanted in the game space, but is a parameter showing the angle at which the game plane GP is virtually slanted with the position of the game plane GP being fixed (Y=0). The virtual slanting angle θ set for the game plane GP is set by two angles, i.e., the angle θx around the Z axis and the angle θz around the X axis in the game space coordinate system.

It is assumed that, as shown in FIG. 9A, the player touch-operates the touch operation at the touch coordinate position TP (x3, y3) of the touch panel 13. In this case, the angle θx around the Z axis of the virtual slanting angle which is set for the game plane GP is determined in accordance with the x coordinate of the touch coordinate position TP, and the angle θz around the X axis is determined in accordance with the y coordinate of the touch coordinate position TP.

FIG. 9B illustrates an example of the virtual slanting angle θx of the game plane GP. The slanting angle θx is set as an angle around the Z axis of a game plane GPi virtually slanted based on the fixed game plane GP (Y=0), and $-\pi/2 < \theta x < \pi/2$ ($\pi$ is the ratio of the circumference of a circle to its diameter; $\pi/2 = 90°$). The slanting angle θx set for the game space of Y<0 is set to be positive (θx>0; the state in FIG. 9B). The slanting angle θx varies in accordance with the x coordinate of the touch coordinate position TP.

In FIG. 9B, a plane which is slanted with respect to the game plane GP at the slanting angle θx and crosses the game plane GP along the Z axis is shown as the virtual game plane GPi. When the slanting angle θx is set, the virtual game plane GP can be represented as being slanted as the game plane GPi. When the touch coordinate position TP (x3, y3) in FIG. 9A is touch-operated, the slanting angle θx is updated by adding b (x3−w) to the current slanting angle θx. b is a constant of b>0, and θx is updated within the range of $-\pi/2 < \theta x < \pi/2$. Namely, the change amount of the slanting angle θx is set in accordance with the distance in the x axis direction between the touch coordinate position TP which is touch-operated and the reference coordinate position D (i.e., |x3−w|). When x3>w, the change amount has a positive value, and when x3<w, the change amount has a negative value.

In this example, the change amount of the slanting angle θx is determined in accordance with the touch coordinate position. Alternatively, the slanting angle θx itself may be determined in accordance with the touch coordinate position. For example, when the touch coordinate position TP (x3, y3) is touch-operated, the slanting angle θx may be set to b(x3−w).

FIG. 9C illustrates an example of the virtual slanting angle θz of the game plane. The slanting angle θz is set as an angle around the X axis of a game plane GPi virtually slanted based on the fixed game plane GP (Y=0), and $-\pi/2 < \theta z < \pi/2$. The slanting angle θz set for the game space of Y<0 is set to be positive (θz>0; the state in FIG. 9C). The slanting angle θz varies in accordance with the y coordinate of the touch coordinate position TP.

In FIG. 9C, a plane which is slanted with respect to the game plane GP at the slanting angle θz and crosses the game plane GP along the X axis is shown as the virtual game plane GPi. When the slanting angle θz is set, the virtual game plane GP can be represented as being slanted as the game plane GPi. When the touch coordinate position (x3, y3) TP in FIG. 9A is touch-operated, the slanting angle θz is updated by adding c (y3−h) to the current slanting angle θz. c is a constant of c>0, and θz is updated within the range of $-\pi/2 < \theta z < \pi/2$. Namely, the change amount of the slanting angle θz is set in accordance with the distance in the y axis direction between the touch coordinate position TP which is touch-operated and the reference coordinate position D (i.e., |y3−h|). When y3>h, the change amount is a positive value, and when y3<h, the change amount is a negative value.

In this example, the change amount of the slanting angle θz is determined in accordance with the touch coordinate position. Alternatively, the slanting angle θz itself may be determined in accordance with the touch coordinate position. For example, when the touch coordinate position TP (x3, y3) is touch-operated, the slanting angle θz may be set to c(y3−h). In this example, the slant of the game plane is virtual. Alternatively, the slanting angle may be determined in the above-described method, and the coordinate position of the game plane GP may be changed such that the game plane GP is actually slanted.

Figure 10:
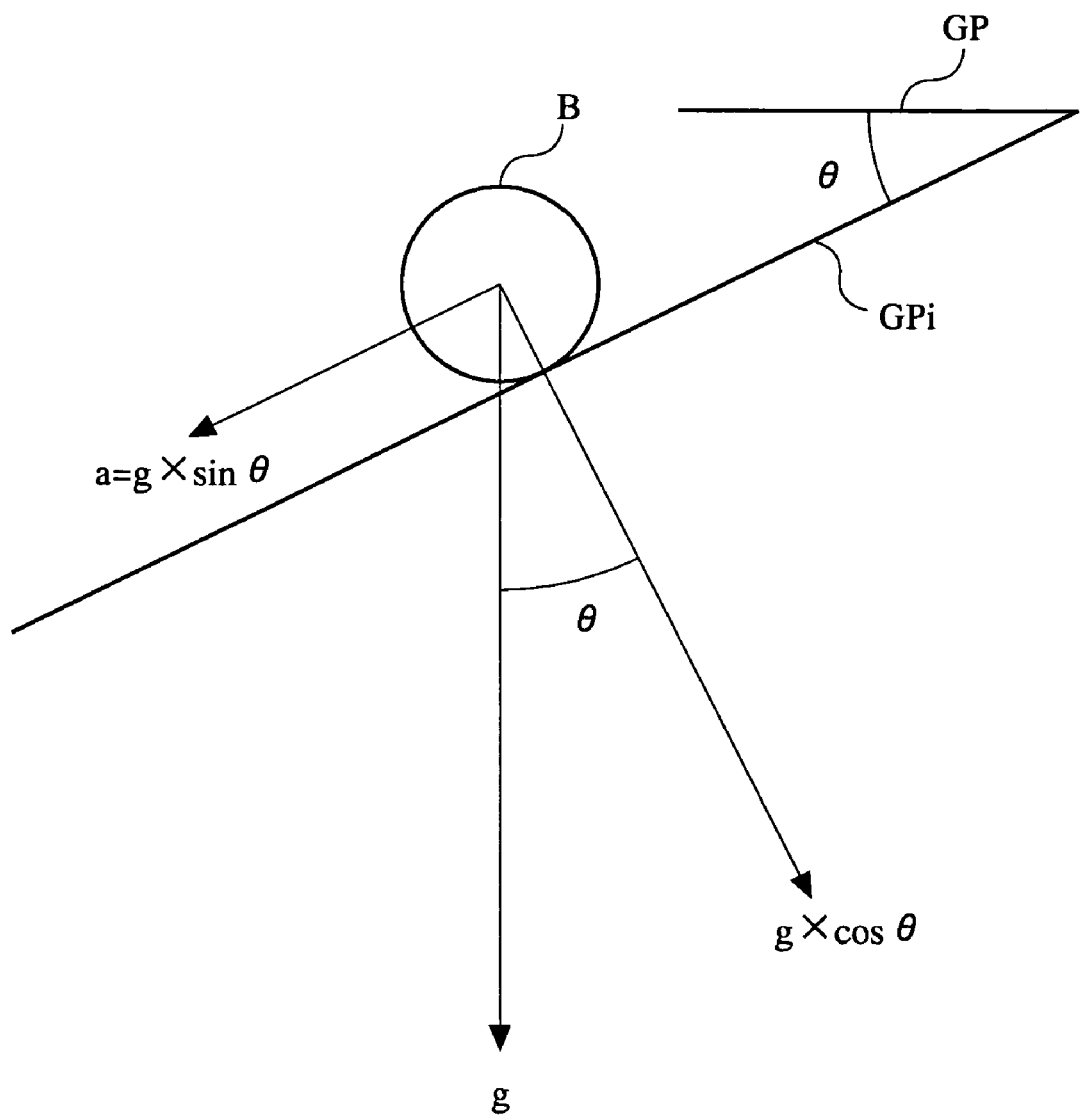
FIG. 10 illustrates an acceleration a of the ball B which is set in accordance with a virtual slanting angle θ of the game plane shown in FIGS. 9A through 9C.

FIG. 10 illustrates an acceleration a of the ball B in accordance with the virtual slanting angle θ of the game plane which is set with respect to the game plane GP. A virtual game plane GPi which crosses the game plane GP at the slanting angle θ is assumed, and a ball B rolling on the virtual game plane GPi is considered. When the gravitational acceleration virtually acting on the game space is g, the acceleration a of the ball B which is on the virtual game plane GPi is set as a=g×sin θ. Because the slanting angle θ is set by the slanting angles θx and θz, the acceleration ax of the ball B in the plus X axis direction is set in accordance with the slanting angle θx, and the acceleration θz of the ball B in the plus Z axis direction is set in accordance with the slanting angle θz. Specifically, the acceleration ax is set as ax=g×sin θx, and the acceleration az is set as az=g×sin θz.

In this example, the acceleration of the ball B is determined based on the slanting angle θ in order to represent that the ball B moves (rolls) by the virtual gravity. However, it is not necessary to accurately represent the movement by the virtual gravity. Therefore, the speed of the ball B may be determined based on the slanting angle θ, or any other manner of moving which provides surprises specifically highly evaluated in games may be introduced.

FIGS. 11A through 11E show camera control by a virtual camera C1 for creating a first game image and a virtual camera C2 for creating a second game image and examples of the game images, in the case where there is no virtual slant of the game plane (i.e., the slanting angles θx and θz are both 0°). When there is no virtual slant of the game plane, the viewing direction of the virtual camera C1 for creating the first game image is the direction which crosses the game plane GP of Y=0 at angle α and has no X axis direction component. The camera C1 is set at such a position that the viewing direction of the camera C1 passes through the center of the ball B (see FIG. 11B and FIG. 11C). A three-dimensional representation of the game plane GP (game stage) is provided by the virtual camera C1, and the state where the ball B is located on the game plane GP is represented (see FIG. 11A).

Figure 11C:
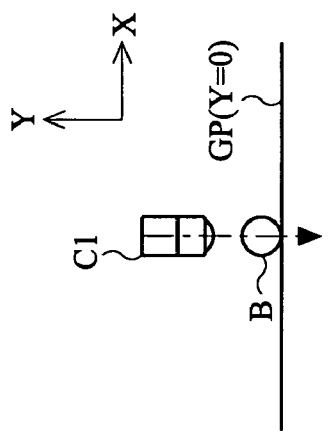
FIGS. 11A through 11E illustrate camera control of a virtual camera C1 and a virtual camera C2 and examples of the game images taken by the cameras C1 and C2 when there is no virtual slant of the game plane.
Figure 11E:
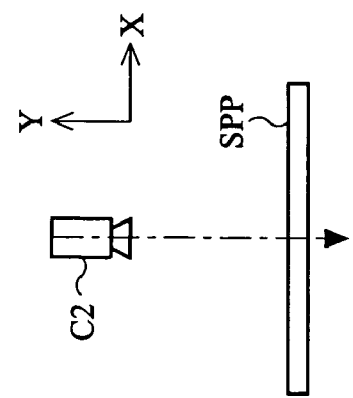
Figure 11B:
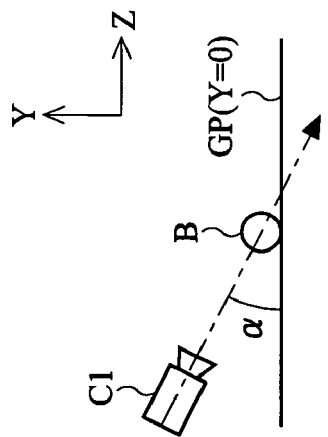
Figure 11D:
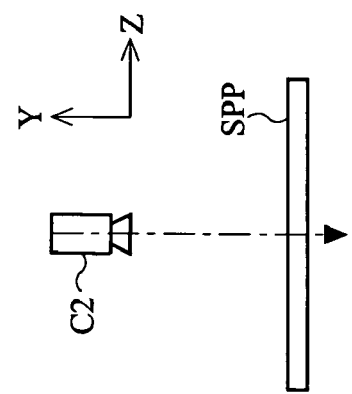
Figure 11A:
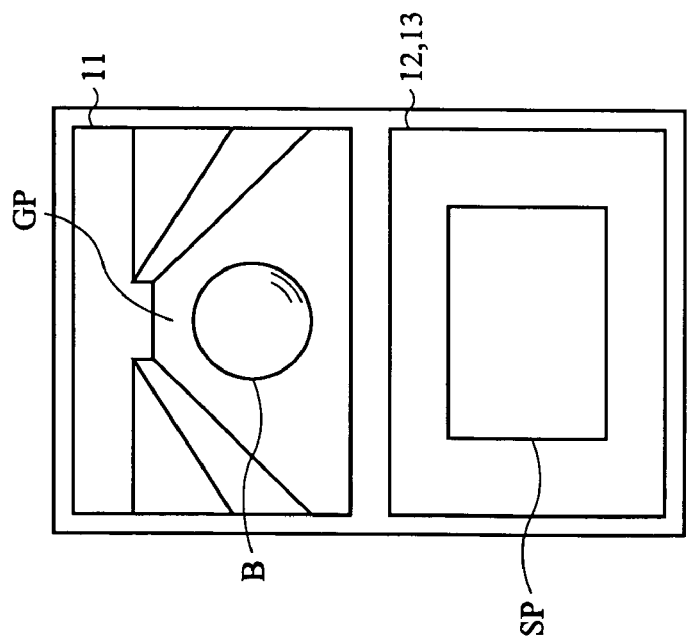

In the state of FIG. 11A, the acceleration of the ball B is 0. Where, for example, the ball B is at a stop, the ball B remains at a stop. From this, when the game plane is represented as in FIG. 11A, the player perceives that the game plane is horizontal.

When there is no virtual slant of the game plane, the viewing direction of the virtual camera C2 for creating the second game image is the direction which perpendicularly crosses one main surface of a sub plane polygon SPP which is a flat plate-like object located at Y=0. The camera C2 is set at such a position that the viewing direction of the camera C2 passes through the center of the sub plane polygon SPP (see FIG. 11D and FIG. 11E). The virtual camera C2 and the sub plane polygon SPP are located in a three-dimensional space different from the game space containing the game plane GP. As the second game image created by the virtual camera C2, an image of the sub plane polygon SPP which is seen from just above is represented. Namely, only one main surface of a sub plane image SP is represented (see FIG. 11A). The state shown in FIGS. 11A through 11E is the state where, for example, there is no touch operation by the player. Therefore, typically, the acceleration of the ball B is 0, and where the ball B is at a stop, the ball B is represented as remaining at a stop on the game plane GP.

Figure 12C:
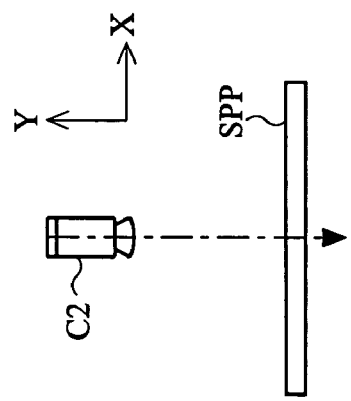
FIGS. 12A through 12E illustrate camera control of the virtual camera C1 and the virtual camera C2 and examples of the game images taken by the cameras C1 and C2 when an upper area of the touch panel 13 is touch-operated from the state shown in FIGS. 11A through 11E.
Figure 12B:
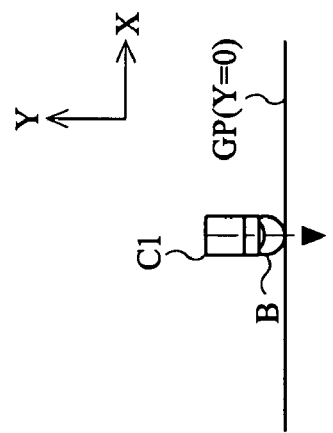
Figure 12E:
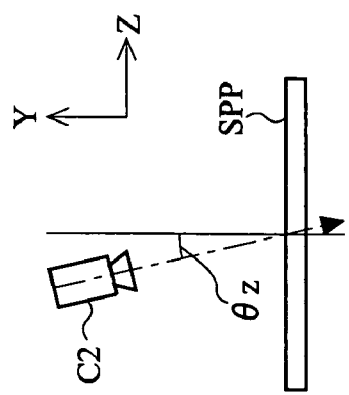
Figure 12D:
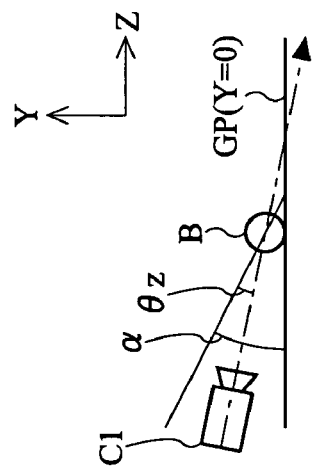
Figure 12A:
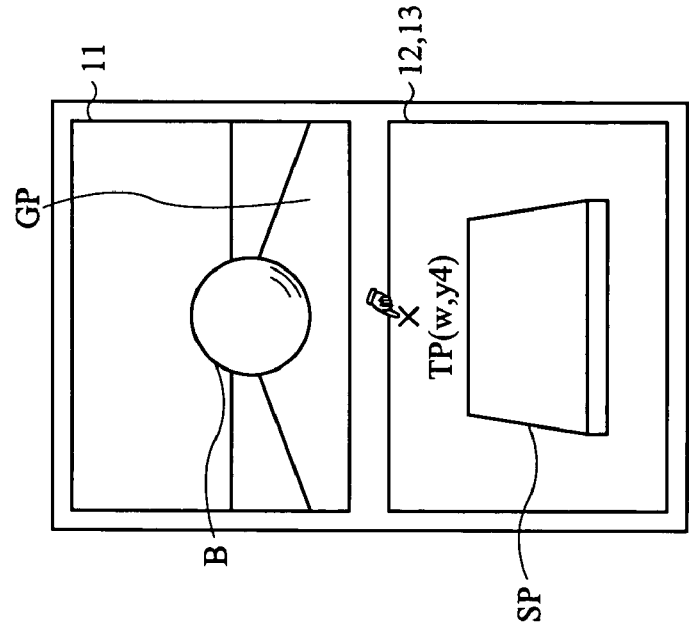
Figure 13A:
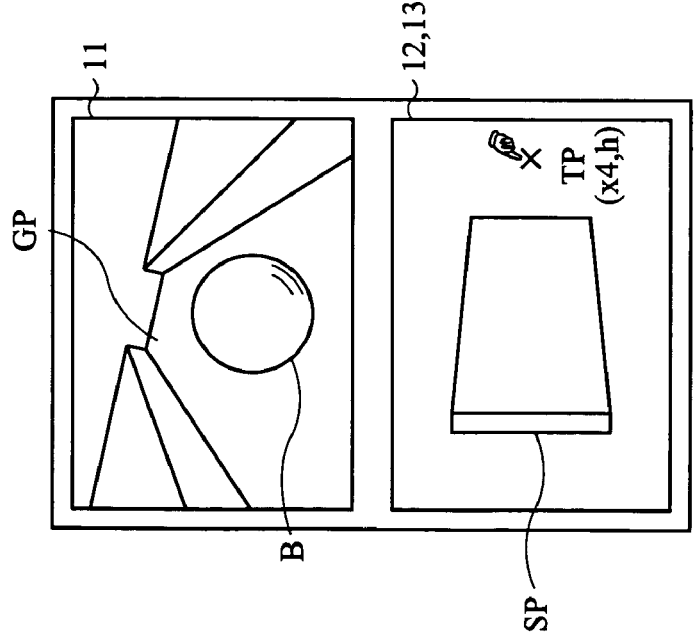
FIGS. 13A through 13E illustrate camera control of the virtual camera C1 and the virtual camera C2 and examples of the game images taken by the cameras C1 and C2 when a right area of the touch panel 13 is touch-operated from the state shown in FIGS. 11A through 11E.
Figure 13B:
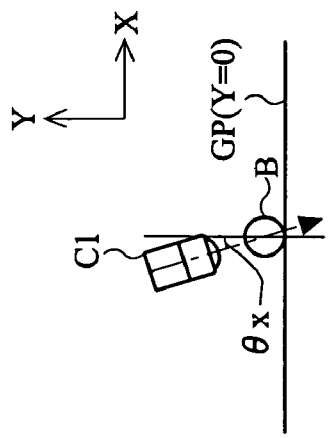
Figure 13C:
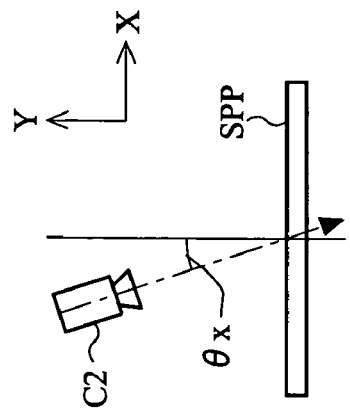
Figure 13D:
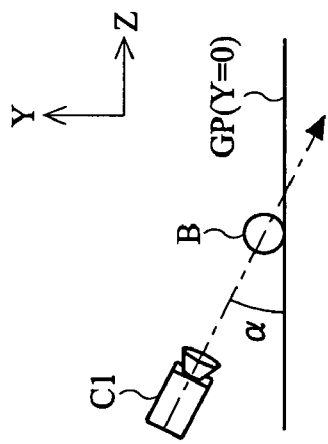
Figure 13E:
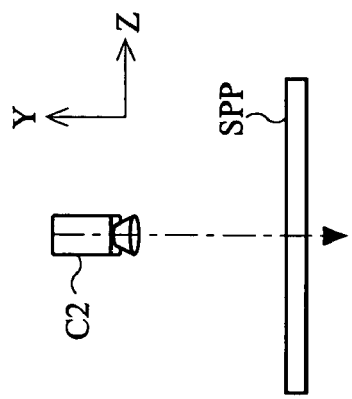
Figure 14A:
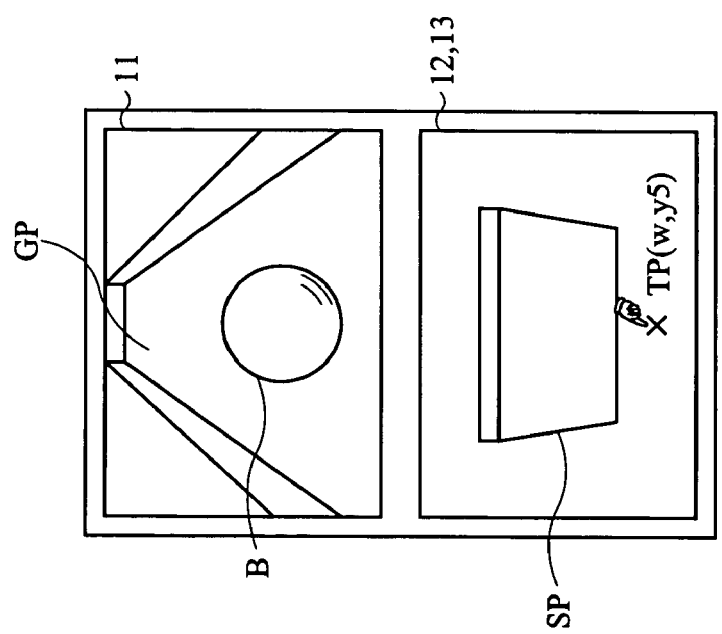
FIGS. 14A through 14E illustrate camera control of the virtual camera C1 and the virtual camera C2 and examples of the game images taken by the cameras C1 and C2 when a lower area of the touch panel 13 is touch-operated from the state shown in FIGS. 11A through 11E.
Figure 14B:
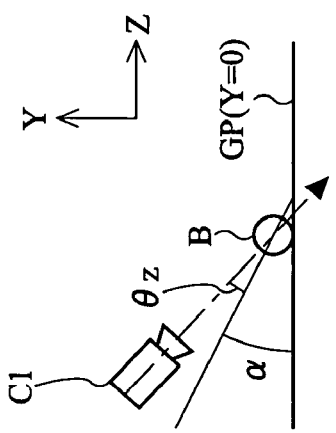
Figure 14C:
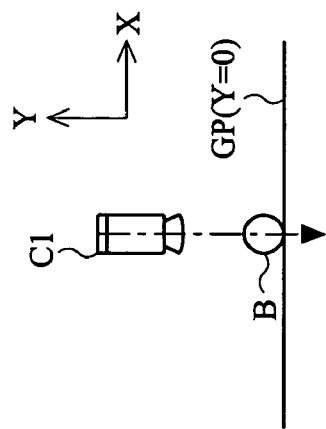
Figure 14D:
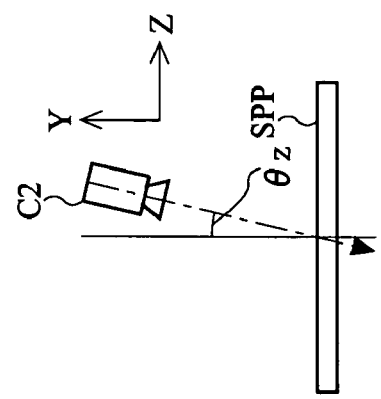
Figure 14E:
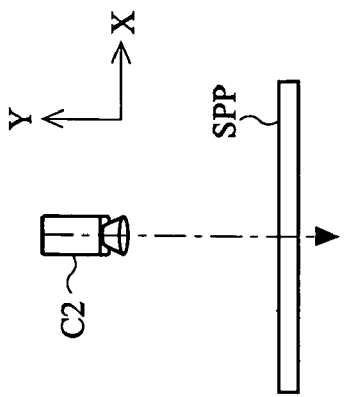
Figure 15A:
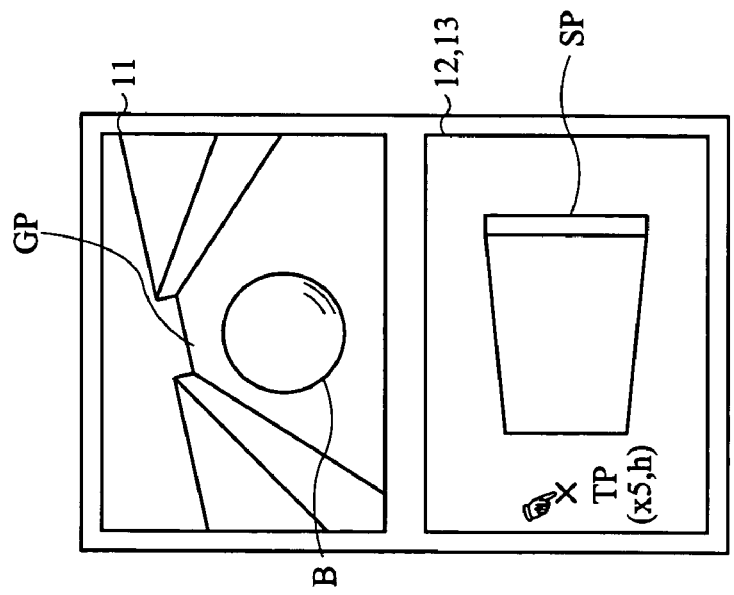
FIGS. 15A through 15E illustrate camera control of the virtual camera C1 and the virtual camera C2 and examples of the game images taken by the cameras C1 and C2 when a left area of the touch panel 13 is touch-operated from the state shown in FIGS. 11A through 11E.
Figure 15B:
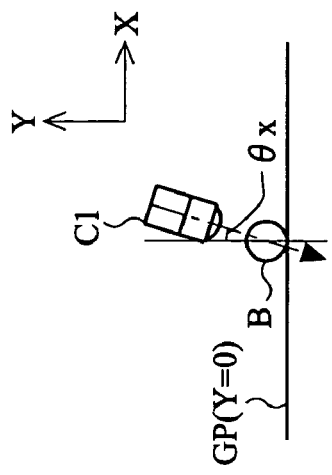
Figure 15C:
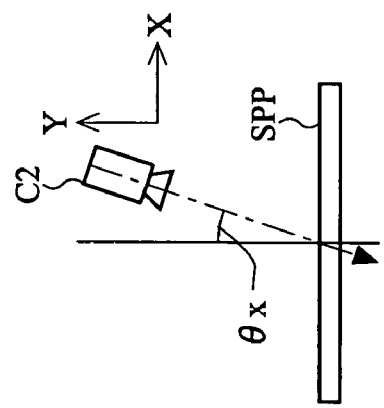
Figure 15D:
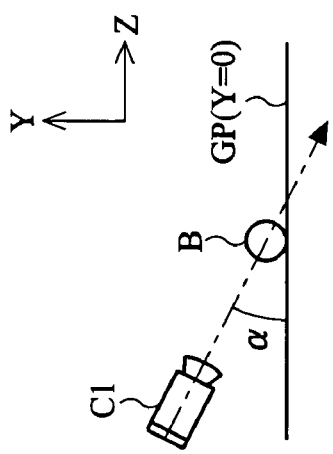
Figure 15E:
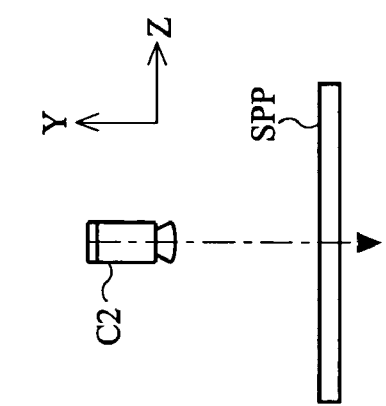

FIGS. 12A through 12E show camera control by the virtual camera C1 and the virtual camera C2, and examples of the game images, in the case where an upper area of the touch panel 13 (the touch coordinate position (w, y4) where y4>h) is touch-operated (see FIG. 12A) from the state shown in FIGS. 11A through 11E. The slanting angle θz is updated in accordance with c(y4−h), which is determined in accordance with the y coordinate of the touch coordinate position TP which has been touched and the y coordinate of the reference coordinate position D. Because y4>h, the change amount of the slanting angle θz is set to a positive value (θz>0). By contrast, the change amount of the slanting angle θx is 0 because the x coordinate of the touch coordinate position TP which has been touch-operated is equal to the x coordinate of the reference coordinate position D. In this case, the viewing direction of the virtual camera C1 moves from the viewing direction shown in FIGS. 11A through 11E, by the same amount as the change amount, in a direction opposite to the direction in which the slant of the game plane changes. Furthermore, as the viewing direction changes, the position of the virtual camera C1 is changed such that the viewing direction of the virtual camera C1 passes through the center of the ball B. In other words, the viewing direction of the virtual camera C1 is the direction which crosses the game plane GP of Y=0 at angle α−θz (see FIG. 12B) and has no X axis direction component (FIG. 12C). The virtual camera C1 is located at such a position that the viewing direction thereof passes through the center of the ball B. A three-dimensional representation of the game plane GP (game stage) is provided by the virtual camera C1, and the state where the ball B is located on the game plane GP is represented (see FIG. 12A). The game plane GP in the first game image (FIG. 12A) is represented as slanting forward at the angle θz as compared to the game plane GP shown in FIG. 11A.

The viewing direction of the virtual camera C2 also moves from the viewing direction shown in FIGS. 11A through 11E, by the same amount as the change amount, in a direction opposite to the direction in which the slant of the game plane changes. Namely, the viewing direction of the virtual camera C2 is the direction which crosses, at angle 90°−θz, the above-mentioned main surface of the sub plane polygon SPP which is a flat plate-like object located at Y=0 (see FIG. 12D), and has no X axis direction component (see FIG. 12E). The camera C2 is set at such a position that the viewing direction of the camera C2 passes through the center of the sub plane polygon SPP. As the second game image created by the virtual camera C2, a sub plane image SP slanting forward is represented (in the state where the above-mentioned main surface and a side surface closer to the player of the sub plan image SP can be seen; see FIG. 12A).

As described above, when the upper area of the touch panel 13 is touch-operated, the viewing direction of each of the virtual cameras C1 and C2 is updated from the viewing direction shown in FIGS. 11A through 11E, by the angle θz, in a direction opposite to the direction in which the virtual slant of the game plane changes. As the viewing direction changes, the position of the camera C2 is changed such that the viewing direction thereof passes through the center of the sub plane polygon SPP. By such setting, in the first game image, the game plane GP is represented as slanting forward; and in the second game image, the sub plane image SP is represented as slanting forward. Namely, the sub plane image SP and the game plane GP (game stage) are represented as slanting in accordance with the position of the touch panel 13 which is touch-operated by the player. Because the acceleration of the ball B is set in the plus Z axis direction, the ball B moves rolling on the game plane GP in the plus Z axis direction. As a result, a game image in which the ball B rolls in accordance with the slant of the game plane GP can be represented as the first game image.

FIGS. 13A through 13E show camera control by the virtual camera C1 and the virtual camera C2, and examples of the game images, in the case where a right area of the touch panel 13 (the touch coordinate position (x4, h) where x4>w) is touch-operated (see FIG. 13A) from the state shown in FIGS. 11A through 11E. The slanting angle θx is updated in accordance with b(x4−w), which is determined in accordance with the x coordinate of the touch coordinate position TP which has been touched and the x coordinate of the reference coordinate position D. Because x4>w, the change amount of the slanting angle θx is set to a positive value (θx>0). By contrast, the change amount of the slanting angle θz is 0 because the y coordinate of the touch coordinate position TP which has been touch-operated is equal to the y coordinate of the reference coordinate position D. In this case, the viewing direction of the virtual camera C1 moves from the viewing direction shown in FIGS. 11A through 11E, by the same amount as the change amount, in a direction opposite to the direction in which the slant of the game plane changes. Furthermore, as the viewing direction changes, the position of the virtual camera C1 is changed such that the viewing direction of the virtual camera C1 passes through the center of the ball B. In other words, the viewing direction of the virtual camera C1 is the direction which crosses the game plane GP of Y=0 at angle α x when seen in the X axis direction (see FIG. 13B) and crosses the game plane GP at angle 90°−θx when seen in the Z axis direction (see FIG. 13C). The virtual camera C1 is located at such a position that the viewing direction thereof passes through the center of the ball B. A three-dimensional representation of the game plane GP (game stage) which is slanted rightward at the angle θx as compared to the game plane GP shown in FIG. 11A is provided by the virtual camera C1, and the state where the ball B is located on the game plane GP is represented (see FIG. 13A).

The viewing direction of the virtual camera C2 also moves from the viewing direction shown in FIGS. 11A through 11E, by the same amount as the change amount, in a direction opposite to the direction in which the slant of the game plane changes. Namely, the viewing direction of the virtual camera C2 is the direction which passes the center of the sub plane polygon SPP located at Y=0 and crosses, at angle 90°−θx, the above-mentioned main surface of the sub plane polygon SPP (see FIG. 13E), and has no Z axis direction component (see FIG. 13D). The camera C2 is set at such a position that the viewing direction of the camera C2 passes through the center of the sub plane polygon SPP. As the second game image created by the virtual camera C2, the sub plane image SP slanting rightward is represented (in the state where the above-mentioned main surface and a left side surface of the sub plan image SP can be seen; see FIG. 13A).

As described above, when the right area of the touch panel 13 is touch-operated, the viewing direction of each of the virtual cameras C1 and C2 is updated from the viewing direction shown in FIGS. 11A through 11E, by the angle θx, in a direction opposite to the direction in which the virtual slant of the game plane changes. As the viewing direction changes, the position of the camera C2 is changed such that the viewing direction thereof passes through the center of the sub plane polygon SPP. By such setting, in the first game image, the game plane GP is represented as slanting rightward; and in the second game image, the sub plane image SP is represented as slanting rightward. Namely, the sub plane image SP and the game plane GP (game stage) are represented as slanting in accordance with the position of the touch panel 13 which is touch-operated by the player. Because the acceleration of the ball B is set in the plus X axis direction, the ball B moves rolling on the game plane GP in the plus X axis direction. As a result, a game image in which the ball B rolls in accordance with the slant of the game plane GP can be represented as the first game image.

FIGS. 14A through 14E show camera control by the virtual camera C1 and the virtual camera C2, and examples of the game images, in the case where a lower area of the touch panel 13 (the touch coordinate position (w, y5) where y5<h) is touch-operated (see FIG. 14A) from the state shown in FIGS. 11A through 11E. The slanting angle θz is updated in accordance with c (y5−h), which is determined in accordance with the y coordinate of the touch coordinate position TP which has been touched and the y coordinate of the reference coordinate position D. Because y5<h, the change amount of the slanting angle θz is set to a negative value (θz<0). By contrast, the change amount of the slanting angle θx is 0 because the x coordinate of the touch coordinate position TP which has been touch-operated is equal to the x coordinate of the reference coordinate position D. In this case, the viewing direction of the virtual camera C1 moves from the viewing direction shown in FIGS. 11A through 11E, by the same amount as the change amount, in a direction opposite to the direction in which the slant of the game plane changes. Furthermore, as the viewing direction changes, the position of the virtual camera C1 is changed such that the viewing direction of the virtual camera C1 passes through the center of the ball B. In other words, the viewing direction of the virtual camera C1 is the direction which crosses the game plane GP of Y=0 at angle α+θz (see FIG. 14B) and has no X axis direction component (see FIG. 14C). The virtual camera C1 is located at such a position that the viewing direction thereof passes through the center of the ball B. A three-dimensional representation of the game plane GP (game stage) is provided by the virtual camera C1, and the state where the ball B is located on the game plane GP is represented (see FIG. 14A). The game plane GP in the first game image (FIG. 14A) is represented as slanting rearward at the angle θz as compared to the game plane GP shown in FIG. 11A.

The viewing direction of the virtual camera C2 also moves from the viewing direction shown in FIGS. 11A through 11E, by the same amount as the change amount, in a direction opposite to the direction in which the slant of the game plane changes. Namely, the viewing direction of the virtual camera C2 is the direction which passes through the center of the sub plane polygon SPP located at Y=0 and crosses, at angle 90°−θz, the above-mentioned main surface of the sub plane polygon SPP (FIG. 14D), and has no X axis direction component (see FIG. 14E). The camera C2 is set at such a position that the viewing direction of the camera C2 passes through the center of the sub plane polygon SPP. As the second game image created by the virtual camera C2, the sub plane image SP slanting rearward is represented (in the state where the above-mentioned main surface and a side surface farther from the player of the sub plan image SP can be seen; see FIG. 14A).

As described above, when the lower area of the touch panel 13 is touch-operated, the viewing direction of each of the virtual cameras C1 and C2 is updated from the viewing direction shown in FIGS. 11A through 11E, by the angle θz, in a direction opposite to the direction in which the virtual slant of the game plane changes. As the viewing direction changes, the position of the camera C2 is changed such that the viewing direction thereof passes through the center of the sub plane polygon SPP. By such setting, in the first game image, the game plane GP is represented as slanting rearward; and in the second game image, the sub plane image SP is represented as slanting rearward. Namely, the sub plane image SP and the game plane GP (game stage) are represented as slanting in accordance with the position of the touch panel 13 which is touch-operated by the player. Because the acceleration of the ball B is set in the minus Z axis direction, the ball B moves rolling on the game plane GP in the minus Z axis direction. As a result, a game image in which the ball B rolls in accordance with the slant of the game plane GP can be represented as the first game image.

FIGS. 15A through 15E show camera control by the virtual camera C1 and the virtual camera C2, and examples of the game images, in the case where a left area of the touch panel 13 (the touch coordinate position (x5, h) where x5<w) is touch-operated (see FIG. 15A) from the state shown in FIGS. 11A through 11E. The slanting angle θx is updated in accordance with b(x5−w), which is determined in accordance with the x coordinate of the touch coordinate position TP which has been touched and the x coordinate of the reference coordinate position D. Because x5<w, the change amount of the slanting angle θx is set to a negative value (θx<0). By contrast, the change amount of the slanting angle θz is 0 because the y coordinate of the touch coordinate position TP which has been touch-operated is equal to the y coordinate of the reference coordinate position D. In this case, the viewing direction of the virtual camera C1 moves from the viewing direction shown in FIGS. 11A through 11E, by the same amount as the change amount, in a direction opposite to the direction in which the slant of the game plane changes. In other words, the viewing direction of the virtual camera C1 is the direction which crosses the game plane GP of Y=0 at angle α when seen in the X axis direction (see FIG. 15B) and crosses the game plane GP at angle 90°−θx when seen in the Z axis direction (see FIG. 15C). The virtual camera C1 is located at such a position that the viewing direction thereof passes through the center of the ball B. A three-dimensional representation of the game plane GP (game stage) which is slanted leftward at the angle θx as compared to the game plane GP shown in FIG. 11A is provided by the virtual camera C1, and the state where the ball B is located on the game plane GP is represented (see FIG. 15A).

The viewing direction of the virtual camera C2 also moves from the viewing direction shown in FIGS. 11A through 11E, by the same amount as the change amount, in a direction opposite to the direction in which the slant of the game plane changes. Namely, the viewing direction of the virtual camera C2 is the direction which passes through the center of the sub plane polygon SPP located at Y=0 and crosses, at angle 90°−θx, the above-mentioned main surface of the sub plane polygon SPP (see FIG. 15E), and has no Z axis direction component (see FIG. 15D). The camera C2 is set at such a position that the viewing direction of the camera C2 passes through the center of the sub plane polygon SPP. As the second game image created by the virtual camera C2, the sub plane image SP slanting leftward is represented (in the state where the above-mentioned main surface and a right side surface of the sub plan image SP can be seen; see FIG. 15A).

As described above, when the left area of the touch panel 13 is touch-operated, the viewing direction of each of the virtual cameras C1 and C2 is updated from the viewing direction shown in FIGS. 11A through 11E, by the angle θx, in a direction opposite to the direction in which the virtual slant of the game plane changes. As the viewing direction changes, the position of the camera C2 is changed such that the viewing direction thereof passes through the center of the sub plane polygon SPP. By such setting, in the first game image, the game plane GP is represented as slanting leftward; and in the second game image, the sub plane image SP is represented as slanting leftward. Namely, the sub plane image SP and the game plane GP (game stage) are represented as slanting in accordance with the position of the touch panel 13 which is touch-operated by the player. Because the acceleration of the ball B is set in the minus X axis direction, the ball B moves rolling on the game plane GP in the minus X axis direction. As a result, a game image in which the ball B rolls in accordance with the slant of the game plane GP can be represented as the first game image.

Figure 16A:
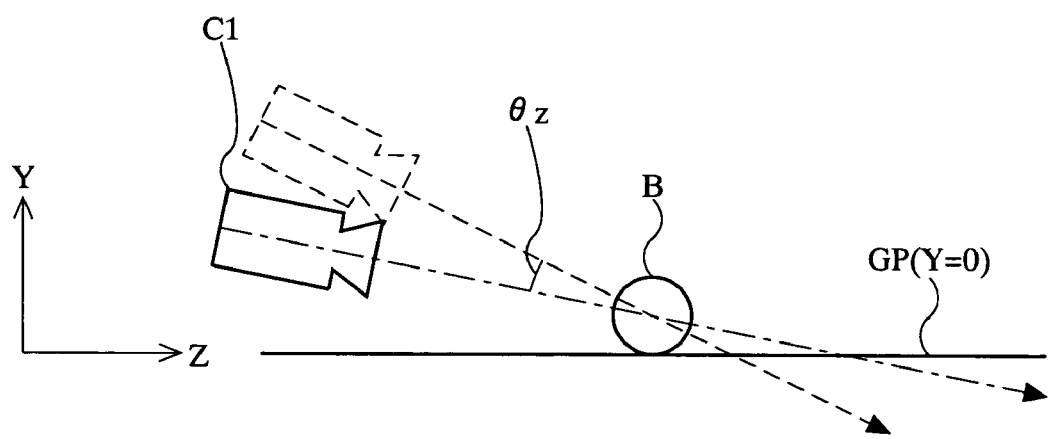
FIG. 16A and FIG. 16B collectively illustrate camera control of the virtual camera C1.
Figure 16B:
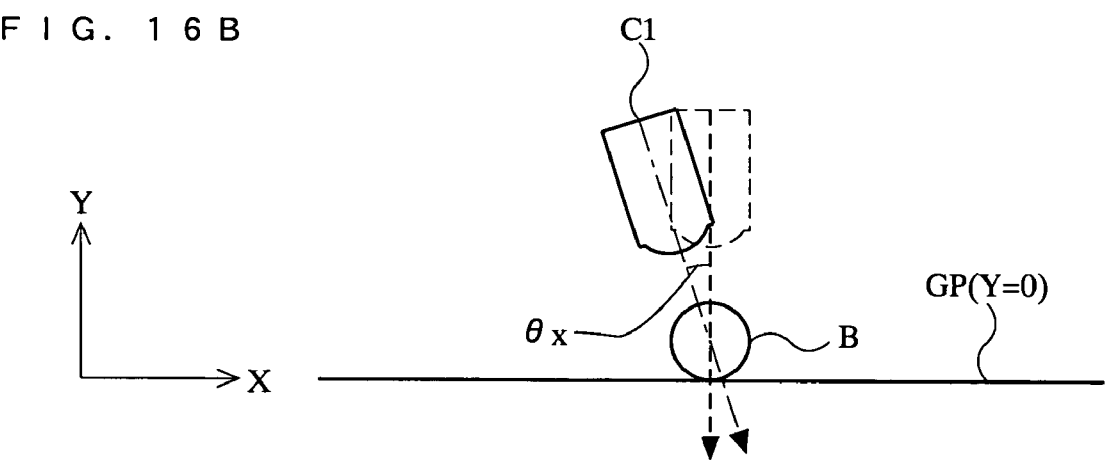

FIG. 16A collectively illustrates the directions of the viewing direction of the virtual camera C1 when seen in the X axis direction described above with reference to FIGS. 11A through 15E, and FIG. 16B collectively illustrates the directions of the viewing direction of the virtual camera C1 when seen in the Z axis direction. In FIG. 16A and FIG. 16B, the dashed line represents the virtual camera C1 and the viewing direction thereof in the case where there is no virtual slant of the game plane shown in FIGS. 11A through 11E (i.e., in the case where both of the slanting angles θx and θz are 0°). When the virtual slanting angles θx and θz are changed in accordance with the touch coordinate position TP which has been touch-operated, the viewing direction of the virtual camera C1 moves from the viewing direction shown in FIGS. 11A through 11E, by the same amount as the slanting amount, in a direction opposite to the slanting direction of the game plane. As shown in FIG. 16A, the viewing direction of the virtual camera C1 moves from the viewing direction shown in FIGS. 11A through 11E, by the virtual slanting angle θz of the game plane, in a direction opposite to the direction indicated by the slanting angle θz. As shown in FIG. 16B, the viewing direction of the virtual camera C1 moves from the viewing direction shown in FIGS. 11A through 11E, by the virtual slanting angle θx of the game plane, in a direction opposite to the direction indicated by the slanting angle θx. Although the game plane GP is fixed at the horizontal position (Y=0), the virtual camera C1 moves as described above in accordance with the touch operation on the touch panel 13. Therefore, the game image is displayed as if the game plane GP were moving. The virtual camera C1 is set to move in a direction opposite to the direction of the touch coordinate position TP with respect to the reference coordinate position D, by an angle corresponding to the distance between the touch coordinate position TP and the reference coordinate position D.

Regarding the ball B, an acceleration is set in accordance with the virtual slanting angles θx and θz of the game plane, so that the ball B moves on the game plane GP based on the acceleration. Namely, the virtual slanting direction and slanting angles (slanting angles θx and θz) of the game plane GP are set as parameters, and the ball B moves on the game plane GP based on the parameters; however, the position and the viewing direction of the camera C1 are moved such that the game plane GP appears slanting in accordance with the parameters without the game plane GP itself actually slanting. By the movement of the position and the viewing direction of the camera C1 and the movement of the ball B on the game plane GP, the game plane GP is represented as slanting and the ball B is represented as rolling in accordance with the gravitational acceleration generated by the slanting in the first game image.

Figure 17A:
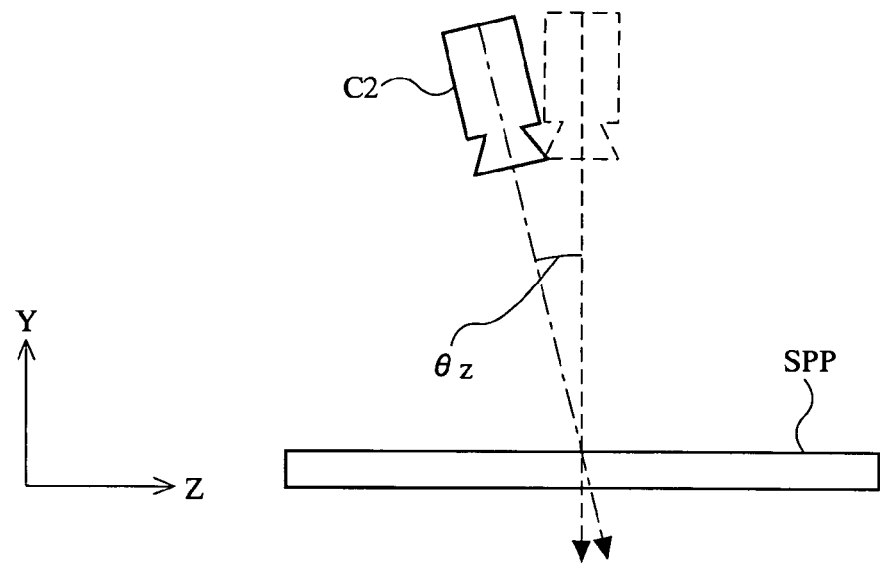
FIG. 17A and FIG. 17B collectively illustrate camera control of the virtual camera C2.
Figure 17B:
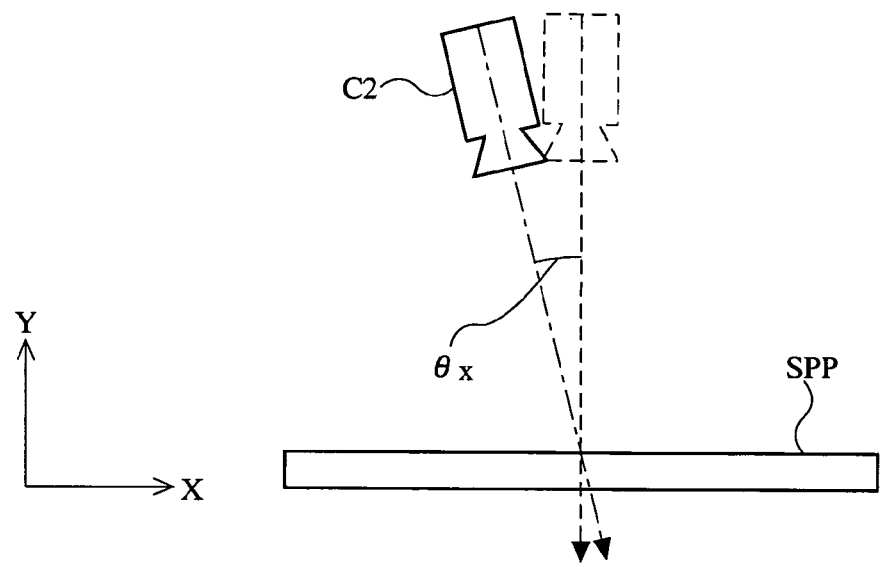

FIG. 17A collectively illustrates the viewing directions of the virtual camera C2 when seen in the X axis direction described above with reference to FIGS. 11A through 15E, and FIG. 17B collectively illustrates the viewing directions of the virtual camera C2 when seen in the Z axis direction. In FIG. 17A and FIG. 17B, the dashed line represents the virtual camera C2 and the viewing direction thereof in the case where there is no virtual slant of the game plane shown in FIGS. 11A through 11E (i.e., in the case where both of the slanting angles θx and θz are 0°). When the virtual slanting angles θx and θz are set in accordance with the touch coordinate position TP which has been touch-operated, the viewing direction of the virtual camera C2 moves from the viewing direction shown in FIGS. 11A through 11E, by the same amount as the slanting amount, in a direction opposite to the slanting direction of the game plane. As shown in FIG. 17A, the viewing direction of the virtual camera C2 moves from the viewing direction shown in FIGS. 11A through 11E, by the virtual slanting angle θz of the game plane, in a direction opposite to the direction indicated by the slanting angle θz. As shown in FIG. 17B, the viewing direction of the virtual camera C2 moves from the viewing direction shown in FIGS. 11A through 11E, by the virtual slanting angle θx of the game plane, in a direction opposite to the direction indicated by the slanting angle θx. Although the sub plane polygon SPP is fixed at the horizontal position (Y=0), the virtual camera C2 moves as described above in accordance with the touch operation on the touch panel 13. Therefore, the game image is displayed as if the sub plane polygon SPP were moving. The virtual camera C2 is set to move in a direction opposite to the direction of the touch coordinate position TP with respect to the reference coordinate position D, by an angle corresponding to the distance between the touch coordinate position TP and the reference coordinate position D. Namely, the virtual slanting direction and slanting angles (slanting angles θx and θz) of the game plane GP in accordance with the touch operation are set as parameters; however, the position and the viewing direction of the camera C2 are moved such that the sub plane polygon SPP appears slanting in accordance with the parameters without the sub plane polygon SPP itself actually slanting. By the movement of the position and the viewing direction of the camera C2, the sub plane polygon SPP is represented as slanting in accordance with the touch operation of the player in the second game image.

Figure 18:
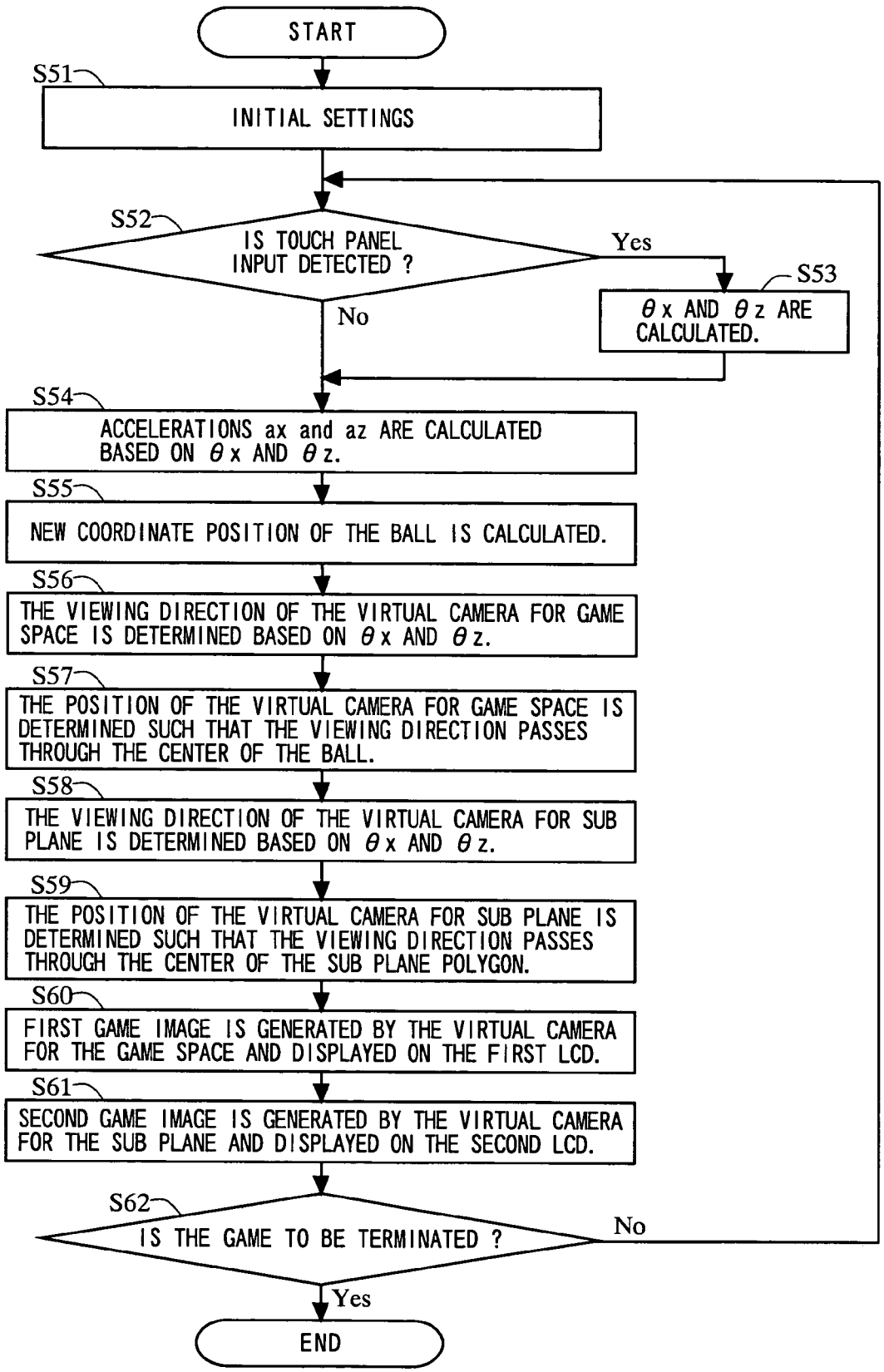
FIG. 18 is a flowchart illustrating processing which is executed by a game program using the game apparatus 1.

With reference to FIG. 18, processing executed by the computer of the game apparatus 1 for carrying out the present invention will be described. FIG. 18 is a flowchart illustrating the processing executed by the game program using the game apparatus 1. The program for carrying out the processing is included in the game program stored in the ROM 171. When the power of the game apparatus 1 is turned on, the program is read from the ROM 171 to the WRAM 22 and is executed by the CPU core 21.

Referring to FIG. 18, when the power of the game apparatus 1 is turned on, various settings of the game apparatus 1 are initialized by a boot ROM (not shown), and at least a part of the program stored in the ROM 171 is read and stored in the WRAM 22. Then, the operation switch section 14 and the like are operated by the player to instruct the start of a game, and the following steps (referred to simply as "S" in FIG. 18) are sequentially carried out.

The CPU core 21 performs initial settings of the game (step 51), and advances the processing to the next step. By the initial settings, a stage represented by the game plane GP is selected from a plurality of stages (labyrinths) by the player, or various game parameters used in the game processing are set to the default values. For example, the virtual slanting angles θx and θz of the game plane and accelerations ax ad az are set to "0".

Next, the CPU core 21 determines whether an input from the touch panel 13 is detected or not (step 52). When the input from the touch panel 13 is detected, the CPU core 21 advances the processing to step 53. When no input from the touch panel 13 is detected, the CPU core 21 advances the processing to step 54.

In step 53, the CPU core 21 calculates the virtual slanting angles θx and θz of the game plane, and advances the processing to step 54. As described above, the slanting angles θx and θz are calculated using the touch coordinate position TP (x, y) of the touch panel 13 which is touch-operated by the player. The CPU core 21 updates the slanting angles θx and θz using the equations:

$\theta x = \theta x + b(x-w)$ $\theta z = \theta z + c(y-h)$

Here, θx and θz of the left side are post-update slanting angles θx and θz, and θx and θz of the right side are the pre-update slanting angles θx and θz. b is a constant of b>0, and c is a constant of c>0. x and y are respectively the x coordinate and the y coordinate of the touch coordinate position TP, and w and h are respectively the x coordinate and the y coordinate of the reference coordinate position D. Using these equations, the CPU core 21 calculates the slanting angles θx and θz which change in the direction of the touch coordinate position TP with respect to the reference coordinate position D, in accordance with the distance between the reference coordinate position D and the touch coordinate position TP.

In step 54, the CPU core 21, calculates the accelerations ax and az of the ball B based on the virtual slanting angles θx and θz of the game plane. The CPU core 21 calculates the accelerations ax and az respectively by:

$ax = g \times \sin \theta x$ $az = g \times \sin \theta z$

Here, g is the gravitational acceleration acting in the vertical direction (in the minus Y axis direction) in the game space. Using these equations, the CPU core 21 calculates the accelerations by which the ball B moves on the game plane GP in accordance with the slanting angles θx and θz. Using the accelerations ax and az calculated in step 54, the CPU core 21 newly calculates the game space coordinate position of the ball B (step 55), and advances the processing to the next step. At this point, the CPU core 21 moves the ball B along the game plane GP at the moving speed and direction obtained by the accelerations ax and az.

Next, the CPU core 21 determines the viewing direction of the virtual camera C1 for the game space, based on the virtual slanting angles θx and θz of the game plane (step 56). As described above, the CPU core 21 moves the viewing direction of the virtual camera C1 from the viewing direction in the case where θx=0 and θz=0 (see FIGS. 11A through 11E), in a direction opposite to the direction indicated by the currently set slanting angles θx and θz, by the slanting angles θx and θz. In this manner, the CPU core 21 determines the viewing direction of the virtual camera C1 such that, in accordance with the touch operation on the touch panel 13, the virtual camera C1 moves in a direction opposite to the direction of the touch coordinate position TP with respect to the reference coordinate position D, by an angle corresponding to the distance between the touch coordinate position TP and the reference coordinate position D. Then, the CPU core 21 sets the position of the virtual camera C1 such that the viewing direction determined in step 56 passes through the center of the ball B located at the game space coordinate position calculated in step 55 (step 57). Then, the CPU core 21 advances the processing to the next step.

Next, the CPU core 21 determines the viewing direction of the virtual camera C2 for the sub plane, based on the virtual slanting angles θx and θz of the game plane (step 58). As described above, the CPU core 21 moves the viewing direction of the virtual camera C2 from the viewing direction in the case where θx=0 and θz=0 (see FIGS. 11A through 11E), in a direction opposite to the direction indicated by the currently set slanting angles θx and θz, by the slanting angles θx and θz. In this manner, the CPU core 21 determines the viewing direction of the virtual camera C2 such that, in accordance with the touch operation on the touch panel 13, the virtual camera C2 moves in a direction opposite to the direction of the touch coordinate position TP with respect to the reference coordinate position D, by an angle corresponding to the distance between the touch coordinate position TP and the reference coordinate position D. Then, the CPU core 21 sets the position of the virtual camera C2 such that the viewing direction determined in step 58 passes through the center of the sub plane polygon SPP (step 59). Then, the CPU core 21 advances the processing to the next step.

Next, using the virtual camera C1 for the game space, the CPU core 21 generates a first game image including the ball B and a part of the game plane GP, and displays the first game image on the first LCD 11 via the first GPU 24 and the first VRAM 23 (step 60). Also, using the virtual camera C2 for the sub plane, the CPU core 21 generates a second game image including the entirety of the sub plane image SP, and displays the second game image on the second LCD 12 via the second GPU 26 and the second VRAM 25 (step 61). Next, the CPU core 21 determines whether the game is to be terminated or not (step 62). When the game is to be continued, the CPU core 21 returns to step 52 to continue the processing. When the game is to be terminated, the CPU core 21 terminates the processing illustrated in the flowchart.

In the above-described embodiment, the touch panel can be operated to slant the game plane with a perception that the touch panel is a plane present in the game space and capable of freely slanting. Therefore, the player can input the slant of the game plane in the game space intuitively and easily. In addition, since the game apparatus itself does not need to be slanted with respect to the eyes of the player, the game plane does not become difficult to view, which raises the degree of freedom of the player's posture during playing.

The first game image is generated by slanting the virtual camera C1 with respect to the virtual slanting angles. Alternatively, the viewing direction of the virtual camera C1 may be fixed regardless of the virtual slanting angles. The first game image is represented in a three-dimensional game space and shows an isometric view of the game plane GP as seen from a position obliquely above. Alternatively, a planar view of the game plane GP as seen in the vertical direction may be represented in a two-dimensional game space. In these cases, the slant of the game plane GP cannot be represented only by the first game image. Therefore, the slant of the game plane GP is represented by the slant of the sub plane image SP represented in the second game image. In the case where the first game image represents the game plane GP which is slanted in accordance with the touch operation, it is not necessary to display the sub plane image SP in the second game image.

For the first game image, the viewing direction of the virtual camera C1 is varied in accordance with the virtual slanting angles of the game plane. The viewing direction of the virtual camera C1 may be varied further in accordance with the moving direction of the ball B. By, for example, matching the viewing direction with the moving direction of the ball B, the player can feel the reality of the ball B moving on the game plane GP in the first game image. This is realized as follows. After the viewing direction of the virtual camera C1 is determined using the slanting angles θx and θz in step 56 in FIG. 18, the determined viewing direction is rotated toward the moving direction of the ball B which is calculated in step 54, using the vertical direction passing through the center of the ball B as the rotation axis. Thus, the viewing direction of the camera C1 can be varied.

There may be a plurality of balls B moving on the game plane GP. By calculating the acceleration of each of the plurality of balls B in accordance with the virtual slant of the game plane, a game of the balls moving on the game plane in accordance with the slant of the game plane in the same manner can be realized. The viewing direction of the virtual camera C1 may be moved with the ball B arbitrarily selected from the plurality of balls B at the center, or may be moved with a particular ball B at the center.

In the above-described embodiment, as an example of a two-screen liquid crystal display section, the first LCD 11 and the second LCD 12 physically independent from each other are located in a vertically stacked manner (two vertically-stacked screens). The two-screen liquid crystal display section may have another structure. For example, the first LCD 11 and the second LCD 12 may be located side by side horizontally on one main surface of the lower housing 18*a*. Alternatively, an LCD which has the same size in the horizontal direction, and is twice as long in the vertical direction, as the first LCD (i.e., one LCD having a display size for two vertically-stacked screens) may be used, so that the first game image and the second game image are displayed in a vertically stacked manner (i.e., the upper game image and the lower game image are displayed adjacent to each other with no border therebetween). Still alternatively, an LCD which has the same size in the vertical direction, and is twice as long in the horizontal direction, as the first LCD may be used, so that the first game image and the second game image are displayed side by side in the horizontal direction (i.e., the right game image and the left game image are displayed adjacent to each other with no border therebetween). Namely, one screen may be divided into two, so as to display the first and second game images. With any format of the game images, the present invention can be carried out as long as the touch panel 13 is provided on the screen displaying the second game image.

While the invention has been described in detail, the foregoing description is in all aspects illustrative and not restrictive. It is understood that numerous other modifications and variations can be devised without departing from the scope of the invention.

What is claimed is:

1. A game apparatus for displaying a game space, in which a game stage is set, in a first display section, the game apparatus comprising:
 a touch panel;
 input coordinate position output programmed logic circuitry for outputting an input coordinate position with respect to a touch panel coordinate position defined in the touch panel, in accordance with a touch operation on the touch panel;
 slant setting programmed logic circuitry for setting a slant of the game stage in the game space in accordance with the input coordinate position which is output; and
 a first display control for displaying, on the first display section, the game stage, the slant of which is changed by the slant setting programmed logic circuitry;
 wherein the slant setting programmed logic circuitry sets the game stage to be slanted in a first direction when an output value of the input coordinate position regarding a first axis of the touch panel coordinate position is larger than a reference value, and sets the game stage to be slanted in a direction opposite to the first direction when the output value of the input coordinate position regarding the first axis is smaller than the reference value, and
 the slant setting programmed logic circuitry sets the game stage to be slanted in a second direction perpendicularly crossing the first direction when an output value of the input coordinate position regarding a second axis perpendicularly crossing the first axis of the touch panel coordinate position is larger than the reference value, and sets the game stage to be slanted in a direction opposite to the second direction when the output value of the input coordinate position regarding the second axis is smaller than the reference value.

2. A game apparatus for displaying a game space on a first display section and executing a game by which a game object moves on a game stage which is set in the game space, the game apparatus comprising:
 a touch panel;
 input coordinate position output programmed logic circuitry for outputting an input coordinate position with respect to a touch panel coordinate position defined in the touch panel, in accordance with a touch operation on the touch panel;
 slant setting programmed logic circuitry for setting a slant of the game stage in the game space in accordance with the input coordinate position which is output;
 a motion regulator for regulating a motion of the game object on the game stage in accordance with the slant;
 a motion controller for controlling the motion of the game object in accordance with the slant which is set by the slant setting programmed logic circuitry, based on the regulation of the motion regulator; and
 a first display control for displaying, on the first display section, the game space including the game object controlled by the motion controller;
 wherein the slant setting programmed logic circuitry sets the game stage to be slanted in a first direction when an output value of the input coordinate position regarding a first axis of the touch panel coordinate position is larger than a reference value, and sets the game stage to be slanted in a direction opposite to the first direction when the output value of the input coordinate position regarding the first axis is smaller than the reference value, and the slant setting programmed logic circuitry sets the game stage to be slanted in a second direction perpendicularly crossing the first direction when an output value of the input coordinate position regarding a second axis perpendicularly crossing the first axis of the touch panel coordinate position is larger than the reference value, and sets the game stage to be slanted in a direction opposite to the second direction when the output value of the input coordinate position regarding the second axis is smaller than the reference value.

3. A game apparatus according to claim 2, wherein the first direction is a viewing direction of a virtual camera used by the first display control for imaging the game space.

4. A game apparatus according to claim 2, wherein the second direction is a direction perpendicularly crossing the viewing direction of the virtual camera used by the first display control for imaging the game space.

5. A game apparatus according to claim 2, wherein the slant setting programmed logic circuitry sets a slanting angle of the game stage in the first direction in accordance with a difference between the value of the input coordinate position regarding the first axis of the touch panel coordinate position and the reference value.

6. A game apparatus according to claim 2, wherein the motion regulator regulates a motion of the game object moving on the game stage toward the direction of the slant of the game stage which is set by the slant setting programmed logic circuitry.

7. A game apparatus according to claim 2, wherein the first display control displays the game stage, on the first display section, as slanting in the game image in accordance with the slant which is set by the slant setting programmed logic circuitry.

8. A game apparatus according to claim 2, wherein the first display control moves a viewing direction of a virtual camera such that the game stage appears slanting in the direction of the slant which is set by the slant setting programmed logic circuitry with the game object as the center, and thus displays the game space as seen from the virtual camera on the first display section.

9. A game apparatus according to claim 8, wherein the first display control moves the viewing direction of the virtual camera in a direction opposite to the direction of the slant which is set by the slant setting programmed logic circuitry with the game object as the center, and thus displays the game stage, on the first display section, as slanting in the direction of the slant in the game image.

10. A game apparatus according to claim 2, further comprising:
a second display section covered with the touch panel and different from the first display section; and
a second display control for displaying, on the second display section, a flat plate-like object as slanting in the game image in accordance with the slant which is set by the slant setting programmed logic circuitry.

11. A game apparatus according to claim 10, wherein the second display control moves a viewing direction of the virtual camera in a direction opposite to the direction of the slant which is set by the slant setting programmed logic circuitry with the flat plate-like object as the center, and thus displays the flat plate-like object, on the second display section, as slanting in the direction of the slant in the game image.

12. A game apparatus according to claim 2, wherein, when the slant setting programmed logic circuitry sets the slant, the first display control fixes the slant of the game stage shown in the game image regardless of the slant which is set by the slant setting programmed logic circuitry and displays the slanted game stage on the first display section.

13. A computer-readable recording medium storing a game program to be executed by a computer of a game apparatus which displays a game space, in which a game stage is set, on a first display section and includes a touch panel, the game program causing the computer to function as:
an input coordinate position detector for detecting an input coordinate position with respect to a touch panel coordinate position defined in the touch panel in accordance with a touch operation on the touch panel;
slant setting programmed logic circuitry for setting a slant of the game stage in the game space in accordance with the detected input coordinate position; and
a first display control for displaying, on the first display section, the game stage, the slant of which is changed by the slant setting programmed logic circuitry;
wherein the slant setting programmed logic circuitry sets the game stage to be slanted in a first direction when a detected value of the input coordinate position regarding a first axis of the touch panel coordinate position is larger than a reference value, and sets the game stage to be slanted in a direction opposite to the first direction when the detected value of the input coordinate position regarding the first axis is smaller than the reference value, and
the slant setting programmed logic circuitry sets the game stage to be slanted in a second direction perpendicularly crossing the first direction when a detected value of the input coordinate position regarding a second axis perpendicularly crossing the first axis of the touch panel coordinate position is larger than the reference value, and sets the game stage to be slanted in a direction opposite to the second direction when the detected value of the input coordinate position regarding the second axis is smaller than the reference value.

14. A computer-readable recording medium storing a game program causing a computer of a game apparatus, which displays a game space on a first display section and includes a touch panel, to execute a game by which a game object moves on a game stage which is set in the game space, the game program causing the computer to function as:
an input coordinate position detector for detecting an input coordinate position with respect to a touch panel coordinate position defined in the touch panel, in accordance with a touch operation on the touch panel;
slant setting programmed logic circuitry for setting a slant of the game stage in the game space in accordance with the detected input coordinate position;
a motion regulator for regulating a motion of the game object on the game stage in accordance with the slant;
a motion controller for controlling the motion of the game object in accordance with the slant which is set by the slant setting programmed logic circuitry, based on the regulation of the motion regulator; and
a first display control for displaying, on the first display section, the game space including the game object controlled by the motion controller;
wherein the slant setting programmed logic circuitry sets the game stage to be slanted in a first direction when a detected value of the input coordinate position regarding a first axis of the touch panel coordinate position is larger than a reference value, and sets the game stage to be slanted in a direction opposite to the first direction when the detected value of the input coordinate position regarding the first axis is smaller than the reference value, and the slant setting programmed logic circuitry sets the game stage to be slanted in a second direction perpendicularly crossing the first direction when a detected value of the input coordinate position regarding a second axis perpendicularly crossing the first axis of the touch panel coordinate position is larger than the reference value, and sets the game stage to be slanted in a direction opposite to the second direction when the detected value of the input coordinate position regarding the second axis is smaller than the reference value.

15. A recording medium storing the game program according to claim 14, wherein the first direction is a viewing direction of a virtual camera used by the first display control for imaging the game space.

16. A recording medium storing the game program according to claim 14, wherein the second direction is a direction perpendicular crossing the viewing direction of the virtual camera used by the first display control for imaging the game space.

17. A recording medium storing the game program according to claim 14, wherein the slant setting programmed logic circuitry sets a slanting angle of the game stage in the first direction in accordance with a difference between the value of the input coordinate position regarding the first axis of the touch panel coordinate position and the reference value.

18. A recording medium storing the game program according to claim 14, wherein the motion regulator regulates a motion of the game object moving on the game stage toward the direction of the slant which is set by the slant setting programmed logic circuitry.

19. A recording medium storing the game program according to claim 14, wherein the first display control displays the game stage, on the first display section, as slanting in the game image in accordance with the slant which is set by the slant setting programmed logic circuitry.

20. A recording medium storing the game program according to claim 14, wherein the first display control moves a viewing direction of a virtual camera such that the game stage appears slanting in the direction of the slant which is set by the slant setting programmed logic circuitry with the game object as the center, and thus displays the game space as seen from the virtual camera on the first display section.

21. A recording medium storing the game program according to claim 20, wherein the first display control moves the viewing direction of the virtual camera in a direction opposite to the direction of the slant which is set by the slant setting programmed logic circuitry with the game object as the center, and thus displays the game stage, on the first display section, as slanting in the direction of the slant in the game image.

22. A recording medium storing the game program according to claim 14, wherein:

the game apparatus further comprises a second display section covered with the touch panel and different from the first display section; and the game program causes the computer to function further as second display control for displaying, on the second display section, a flat plate-like object as slanting in the game image in accordance with the slant which is set by the slant setting programmed logic circuitry.

23. A recording medium storing the game program according to claim 22, wherein the second display control moves the viewing direction of the virtual camera in a direction opposite to the direction of the slant which is set by the slant setting programmed logic circuitry with the flat plate-like object as the center, and thus displays the flat plate-like object, on the second display section, as slanting in the direction of the slant in the game image.

24. A recording medium storing the game program according to claim 14, wherein, when the slant setting programmed logic circuitry sets the slant, the first display control fixes a slant of the game stage shown in the game image regardless of the slant which is set by the slant setting programmed logic circuitry and displays the slanted game stage on the first display section.

* * * * *